(12) United States Patent
Ohno et al.

(10) Patent No.: US 11,760,297 B2
(45) Date of Patent: Sep. 19, 2023

(54) VEHICLE AIRBAG DEVICE

(71) Applicant: TOYOTA JIDOSHA KABUSHIKI KAISHA, Toyota (JP)

(72) Inventors: Mitsuyoshi Ohno, Miyoshi (JP); Jiro Ohachi, Shizuoka-ken (JP); Masashi Hotta, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/886,098

(22) Filed: Aug. 11, 2022

(65) Prior Publication Data

US 2023/0064279 A1    Mar. 2, 2023

(30) Foreign Application Priority Data

Aug. 27, 2021   (JP) ................................. 2021-139384

(51) Int. Cl.
   *B60R 21/207*      (2006.01)
   *B60R 21/231*      (2011.01)
   *B60R 21/2338*     (2011.01)

(52) U.S. Cl.
CPC ........ *B60R 21/207* (2013.01); *B60R 21/2338* (2013.01); *B60R 21/23138* (2013.01); *B60R 2021/23146* (2013.01); *B60R 2021/23386* (2013.01)

(58) Field of Classification Search
None
See application file for complete search history.

(56) References Cited

U.S. PATENT DOCUMENTS

| 6,120,099 A | 9/2000 | Reikerås et al. |
| 7,549,672 B2 * | 6/2009 | Sato .................... B60R 21/2338 |
| | | 280/730.2 |
| 8,485,553 B1 | 7/2013 | Kühne et al. |

(Continued)

FOREIGN PATENT DOCUMENTS

| CN | 102582565 A | 7/2012 |
| DE | 102014201474 A1 | 7/2015 |

(Continued)

OTHER PUBLICATIONS

Non-Final Office Action dated Feb. 7, 2023 to U.S. Appl. No. 17/712,703, filed Apr. 4, 2022.

(Continued)

*Primary Examiner* — Faye M Fleming
(74) *Attorney, Agent, or Firm* — Dinsmore & Shohl LLP

(57) ABSTRACT

A vehicle airbag device comprises an airbag body including a front-rear chamber configured to pass a side of the head of an occupant seated in a vehicle seat and to deploy toward a seat front side as a result of gas being ejected from an inflator actuated, so as to be disposed at the side of the head of the occupant, a leading end chamber is configured to deploy toward a seat width direction inner side from a seat front side end portion of the front-rear chamber so as to be disposed at the seat front side of the head of the occupant, and a shoulder-contact section is configured to contact, from the seat front side, a first shoulder of the occupant so as to restrain the first shoulder, the first shoulder being at an opposite side from a second shoulder of the occupant across which a shoulder belt is worn.

26 Claims, 19 Drawing Sheets

(56) References Cited

U.S. PATENT DOCUMENTS

| | | | |
|---|---|---|---|
| 8,985,622 B1 | 3/2015 | Cannon | |
| 9,994,181 B1* | 6/2018 | Dubaisi | B60R 21/207 |
| 10,336,283 B2* | 7/2019 | Rickenbach | B60R 21/233 |
| 10,710,539 B2* | 7/2020 | Cho | B60R 21/207 |
| 10,870,405 B2* | 12/2020 | Kwon | B60R 21/207 |
| 11,390,235 B2* | 7/2022 | Kim | B60R 21/2338 |
| 2006/0131847 A1 | 6/2006 | Sato et al. | |
| 2012/0242067 A1 | 9/2012 | Kino et al. | |
| 2013/0234421 A1 | 9/2013 | Honda et al. | |
| 2014/0284907 A1 | 9/2014 | Fumito | |
| 2016/0082915 A1 | 3/2016 | Madaras | |
| 2018/0236962 A1 | 8/2018 | Ohno et al. | |
| 2019/0161053 A1 | 5/2019 | Gwon et al. | |
| 2019/0176739 A1 | 6/2019 | Song | |
| 2019/0225184 A1 | 7/2019 | Ohno | |
| 2021/0138989 A1 | 5/2021 | Markusic et al. | |
| 2022/0355758 A1 | 11/2022 | Freisler et al. | |
| 2022/0388472 A1* | 12/2022 | Hwangbo | B60R 21/23138 |
| 2022/0396231 A1 | 12/2022 | Ohno et al. | |
| 2022/0396233 A1 | 12/2022 | Ohno et al. | |
| 2023/0010582 A1 | 1/2023 | Ohachi et al. | |

FOREIGN PATENT DOCUMENTS

| | | |
|---|---|---|
| JP | 2006-008105 A | 1/2006 |
| JP | 2007-191077 A | 8/2007 |
| JP | 2010-076640 A | 4/2010 |
| JP | 2013018378 A | 1/2013 |
| JP | 2014184805 A | 10/2014 |
| JP | 2019-511414 A | 4/2019 |
| JP | 2019127101 A | 8/2019 |
| JP | 2019218013 A | 12/2019 |
| JP | 2021-049898 A | 4/2021 |
| KR | 10-20080003201 A | 1/2008 |
| WO | 2016174785 A1 | 11/2016 |
| WO | 2017099398 A1 | 6/2017 |
| WO | 2019/166268 A1 | 9/2019 |
| WO | 2021121737 A1 | 6/2021 |
| WO | 2022/053331 A1 | 3/2022 |

OTHER PUBLICATIONS

Non-Final Office Action dated Feb. 7, 2023 to U.S. Appl. No. 17/728,446, filed Apr. 25, 2022.

Non-Final Office Action dated Feb. 7, 2023 in U.S. Appl. No. 17/706,032, filed Mar. 28, 2022.

U.S. Appl. No. 17/950,633, filed Sep. 22, 2022 Inventors: Mitsuyoshi Ohno et al.

Notice of Allowance dated Apr. 17, 2023, Issued to U.S. Appl. No. 17/728,446, filed Apr. 25, 2022.

Notice of Allowance dated Apr. 14, 2023, Issued U.S. Appl. No. 17/712,703, filed Apr. 4, 2022.

Notice of Allowance dated Apr. 18, Issued to U.S. Appl. No. 17/706,032, filed Mar. 28, 2022.

* cited by examiner

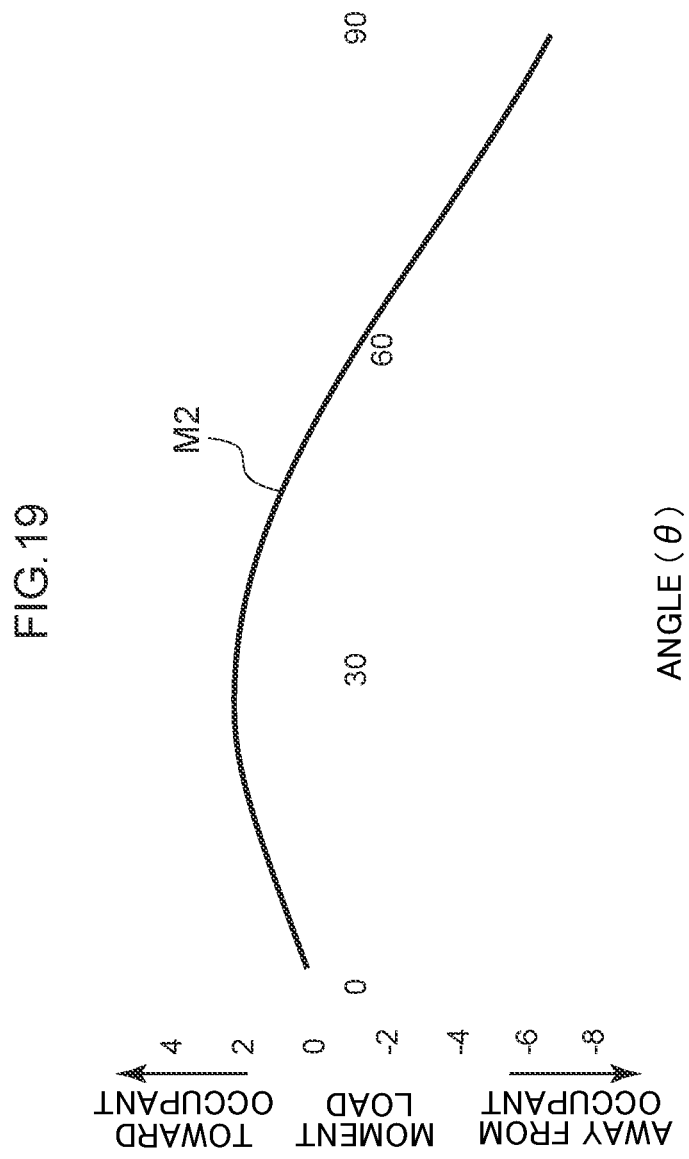

VEHICLE AIRBAG DEVICE

CROSS-REFERENCE TO RELATED APPLICATION

This application is based on and claims priority under 35 USC 119 from Japanese Patent Application No. 2021-139384 filed on Aug. 27, 2021, the disclosure of which is incorporated by reference herein.

BACKGROUND

Technical Field

The present disclosure relates to a vehicle airbag device.

Related Art

Far-side airbag devices such as that disclosed in Japanese Patent Application Laid-Open (JP-A) No. 2021-049898 are known. Such a far-side airbag device includes a first chamber that deploys toward an adjacent seatback from one side section of a seatback on the opposite side to a shoulder belt in an oblique side-on collision or a side-on collision of a vehicle, a second chamber that receives gas supplied from a front end portion of the first chamber so as to deploy toward a seat front side, and a third chamber that receives gas supplied from a front end portion of the second chamber so as to deploy toward a seat width direction inside. The far-side airbag device also includes a tether that couples the first chamber and the third chamber together.

However, since such a far-side airbag device is an airbag device that only deploys on one side, namely a fixed point (base section) of its airbag is only present on one side of the seatback, the airbag attempts to rotate in a direction away from the head of an occupant centered on the fixed point in plan view while the head of the occupant is being restrained during the latter half of a collision.

The likelihood of the head of the occupant incurring a rotational injury increases as a result. Moreover, since space at the side (alongside the side section) of the seatback is limited, sufficient deployment space for the airbag cannot be secured, such that airbag deployment performance is negatively affected, for example airbag deployment may be delayed.

SUMMARY

The present disclosure obtains a vehicle airbag device that enables an airbag body to be deployed at an early stage, and also enables the likelihood of the head of an occupant incurring a rotational injury to be reduced.

A vehicle airbag device of a first aspect includes an airbag body. The airbag body includes a front-rear chamber, a leading end chamber, and a shoulder-contact section. The front-rear chamber is configured to pass a side of the head of an occupant seated in a vehicle seat and to deploy toward a seat front side as a result of gas being ejected from an inflator actuated in a case in which a head-on collision of a vehicle is detected or predicted, so as to be disposed at the side of the head of the occupant. The leading end chamber is configured to deploy toward a seat width direction inner side from a seat front side end portion of the front-rear chamber so as to be disposed at the seat front side of the head of the occupant. The shoulder-contact section is configured to contact, from the seat front side, a first shoulder of the occupant so as to restrain the first shoulder, the first shoulder being at an opposite side from a second shoulder of the occupant across which a shoulder belt is worn.

In the first aspect, in a case in which the inflator is actuated in a vehicle head-on collision, the front-rear chamber of the airbag body passes the side of the head of the occupant seated in the vehicle seat and deploys toward the seat front side so as to be disposed at the side of the head of the occupant. Then, the leading end chamber of the airbag body deploys toward the seat width direction inner side from the seat front side end portion of the front-rear chamber so as to be disposed at the seat front side of the head of the occupant and to restrain the head of the occupant. Note that there is more space at the side of the head of the occupant than at a side (alongside a side section) of a seatback. Thus, there is less of a limit on space than when an airbag deploys toward the seat front side from the side section of the seatback, such that the airbag body is deployed at an early stage.

Moreover, the shoulder-contact section of the airbag body contacts from the seat front side the other shoulder on the opposite side to the second shoulder of the occupant across which the shoulder belt is worn so as to restrain the other shoulder of the occupant. Note that, accompanying forward movement of the occupant in a vehicle head-on collision, the second shoulder restrained by the shoulder belt bears load from the shoulder belt, such that the head and the other shoulder attempt to rotate about an axis with its rotation axial direction in the vertical direction. However, when this occurs, the other shoulder bears load from the airbag body through the shoulder-contact section, such that the head and the other shoulder attempt to rotate in the opposite direction. This enables rotation of the head to be cancelled out, such that the likelihood of the head of the occupant incurring a rotational injury in a vehicle head-on collision is reduced.

A vehicle airbag device of a second aspect is the vehicle airbag device of the first aspect, wherein the shoulder-contact section includes a first shoulder-restraining face configured to extend toward a seat lower side from a lower end portion of the front-rear chamber.

In the second aspect, the shoulder-contact section includes the first shoulder-restraining face that extends toward the seat lower side from the lower end portion of the front-rear chamber of the airbag body. Note that the front-rear chamber is deployed prior to the leading end chamber. Thus, the shoulder-contact section is deployed at an early stage during a vehicle head-on collision. Thus, the likelihood of the head of the occupant incurring a rotational injury is effectively reduced. Moreover, the airbag body is struck by the shoulder of the occupant, such that contact force against the head of the occupant is alleviated. Thus, torsion force arising at the neck of the occupant is also reduced.

A vehicle airbag device of a third aspect is the vehicle airbag device of the first aspect or the second aspect, wherein the airbag body includes a ceiling-abutment section configured to abut a ceiling of a vehicle cabin.

In the third aspect, when the shoulder of the forward-moving occupant abuts the shoulder-contact section of the airbag body in a vehicle head-on collision, a boundary section between the front-rear chamber and the leading end chamber of the airbag body in side view attempts to rotate in a direction approaching the ceiling. When this occurs, the ceiling-abutment section of the airbag body abuts the ceiling and bears reaction force from the ceiling, such that rotation of the airbag body is suppressed, the airbag body is suppressed from riding up toward the upper-front side, and the chest of the occupant is suppressed from pivoting toward the lower side. This suppresses any change to a relative positional relationship between the head and the chest of the occupant, such that an injury severity score for the neck of the occupant is reduced.

A vehicle airbag device of a fourth aspect is the vehicle airbag device of the third aspect, wherein the ceiling-abutment section is configured by a first projecting section configured to extend toward a seat upper side from an upper end portion of the front-rear chamber at a location corresponding to the shoulder-contact section.

In the fourth aspect, since the ceiling-abutment section is provided as the first projecting section at the upper end portion of the front-rear chamber at the location corresponding to the shoulder-contact section of the front-rear chamber that deploys initially, the ceiling-abutment section is deployed at an early stage. Moreover, since the shoulder-contact section and the ceiling-abutment section are provided with a corresponding positional relationship, the airbag body is effectively suppressed from riding up toward the upper-front side and the chest of the occupant is effectively suppressed from pivoting toward the lower side.

A vehicle airbag device of a fifth aspect is the vehicle airbag device of the third aspect or the fourth aspect, wherein the airbag body includes an auxiliary shoulder-contact section configured to contact the second shoulder of the occupant from the seat front side so as to restrain the second shoulder of the occupant.

In the fifth aspect, the auxiliary shoulder-contact section of the airbag body contacts the second shoulder of the occupant across which the shoulder belt is worn from the seat front side so as to restrain the second shoulder of the occupant. Thus, restraint of the occupant by the shoulder belt is effectively assisted in a vehicle head-on collision.

A vehicle airbag device of a sixth aspect is the vehicle airbag device of the fifth aspect, wherein the auxiliary shoulder-contact section includes a second shoulder-restraining face configured to extend toward a seat lower side from a lower end portion of the leading end chamber.

In the sixth aspect, the auxiliary shoulder-contact section includes the second shoulder-restraining face that extends toward the seat lower side from the lower end portion of the leading end chamber of the airbag body. Thus, the airbag body is struck by the other shoulder of the occupant and the second shoulder of the occupant with a good balance, such that contact force against the head of the occupant is alleviated. Torsion force occurring at the neck of the occupant is thereby reduced.

A vehicle airbag device of a seventh aspect is the vehicle airbag device of the fifth aspect or the sixth aspect, wherein the ceiling-abutment section is configured by a second projecting section configured to extend toward a seat upper side from an upper end portion of the leading end chamber at a location corresponding to the auxiliary shoulder-contact section.

In the seventh aspect, the ceiling-abutment section is provided as the second projecting section at the upper end portion of the leading end chamber at the location corresponding to the auxiliary shoulder-contact section of the leading end chamber. Namely, the auxiliary shoulder-contact section and the ceiling-abutment section are provided with a corresponding positional relationship. Thus, the airbag body is effectively suppressed from riding up toward the upper-front side and the chest of the occupant is effectively suppressed from pivoting toward the lower side.

A vehicle airbag device of an eighth aspect is the vehicle airbag device of the third aspect, wherein the ceiling-abutment section is configured by a third projecting section configured to extend toward a seat upper side from an upper end portion of a boundary section between the front-rear chamber and the leading end chamber.

In the eighth aspect, the ceiling-abutment section is provided as the third projecting section at the upper end portion of the boundary section between the front-rear chamber and the leading end chamber. Thus, the airbag body is effectively suppressed from riding up toward the upper-front side and the chest of the occupant is effectively suppressed from pivoting toward the lower side.

A vehicle airbag device of a ninth aspect is the vehicle airbag device of any one of the first aspect to the eighth aspect, wherein the front-rear chamber and the leading end chamber of the airbag body form a "V" shape in plan view. A head-restraining face of the leading end chamber, which is configured to restrain the head of the occupant is set at an acute angle with respect to a central axis line of the front-rear chamber.

In the ninth aspect, the airbag body that forms a "V" shape in plan view covers so as to surround the head of the forward-moving occupant in a vehicle head-on collision. Namely, since the head-restraining face of the leading end chamber is set at an angle of inclination that is an acute angle, a rotation-inducing moment in the opposite direction to a direction away from the head of the occupant can be generated in the airbag body, thereby enabling the airbag body to be made to rotate toward the head of the occupant (in the opposite direction to the direction away from the head). The head of the occupant is effectively suppressed from rotating, and the head of the occupant is effectively restrained as a result.

A vehicle airbag device of a tenth aspect is the vehicle airbag device of any one of the first aspect to the ninth aspect, wherein the vehicle airbag device includes a case in which the airbag body is accommodated, the case including a lid configured to open when the airbag body is deployed. The lid is provided at a position that has left-right symmetry relative to a position of a belt guide, configured to guide the shoulder belt at a position corresponding to the second shoulder of the occupant, with respect to a center line of the vehicle seat.

In the tenth aspect, the vehicle airbag device includes the case in which the airbag body is accommodated, the case including the lid that opens when the airbag body is deployed. The lid is provided at a position that has left-right symmetry relative to the position of the belt guide, configured to guide the shoulder belt at a position corresponding to the second shoulder of the occupant, with respect to the center line of the vehicle seat. This improves the left-right balance of the vehicle seat to give a more favorable appearance. Note that in the present disclosure, "left-right symmetry" refers not only to exact left-right symmetry, but also includes cases in which there is substantially left-right symmetry with slight misalignment from exactly symmetrical positions.

As described above, the present disclosure enables the airbag body to be deployed at an early stage, and also enables the likelihood of the head of the occupant incurring a rotational injury to be reduced.

BRIEF DESCRIPTION OF THE DRAWINGS

Exemplary embodiments of the present disclosure will be described in detail based on the following figures, wherein:

FIG. 19 is a graph illustrating changes in rotation-inducing moment acting on an airbag body with respect to an angle of inclination formed between a front-rear chamber and a leading end chamber configuring an airbag body of a vehicle airbag device according to an exemplary embodiment.

DETAILED DESCRIPTION

Figure 1:
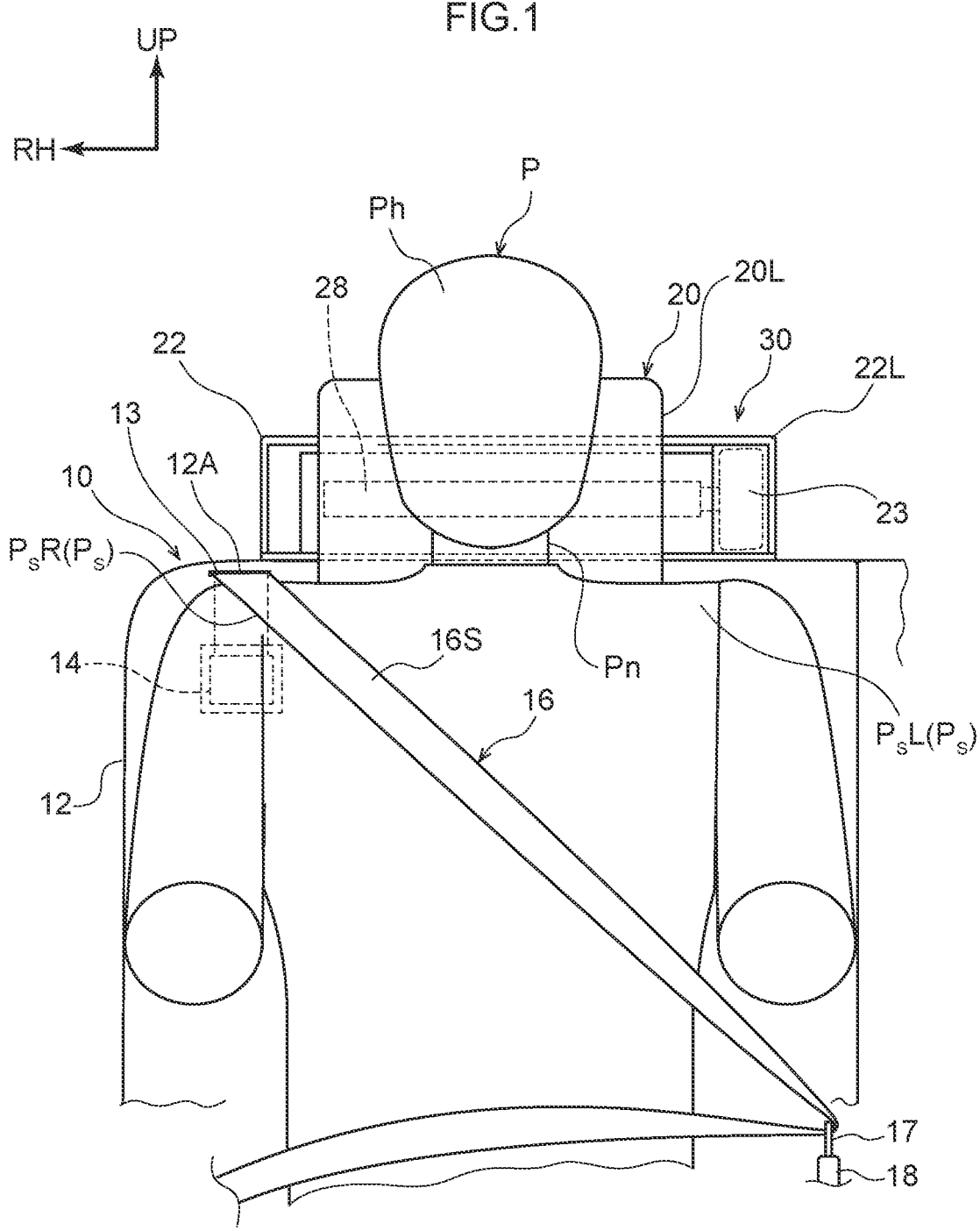
FIG. 1 is a face-on view illustrating a vehicle seat provided with a vehicle airbag device according to an exemplary embodiment together with an occupant.

Detailed explanation follows regarding exemplary embodiments according to the present disclosure, with reference to the drawings. Note that to aid explanation, in the drawings, the arrow UP indicates a seat upward direction, the arrow FR indicates a seat forward direction, and the arrow RH indicates a seat right-hand direction as appropriate. Thus, in the following explanation, unless specifically stated otherwise, reference to vertical, front-rear, and left-right directions refers to vertical, front-rear, and left-right directions of a vehicle seat 10. Moreover, the left-right direction corresponds to a seat width direction.

A vehicle airbag device (hereafter simply referred to as "airbag device") 30 according to the present exemplary embodiment is provided at the rear side of a headrest 20 (described later) of the vehicle seat 10, which is principally employed as rear seating in a vehicle. Although an example is described in which the vehicle seat 10 of the present exemplary embodiment is applied as a right-hand seat (seat width direction outside seat) of the rear seating, the airbag device 30 may be provided to a front seat. As an example, in the present exemplary embodiment, an "occupant P" is an occupant equivalent to a $50^{th}$ percentile adult male (AM50) dummy.

First Exemplary Embodiment

Figure 2:
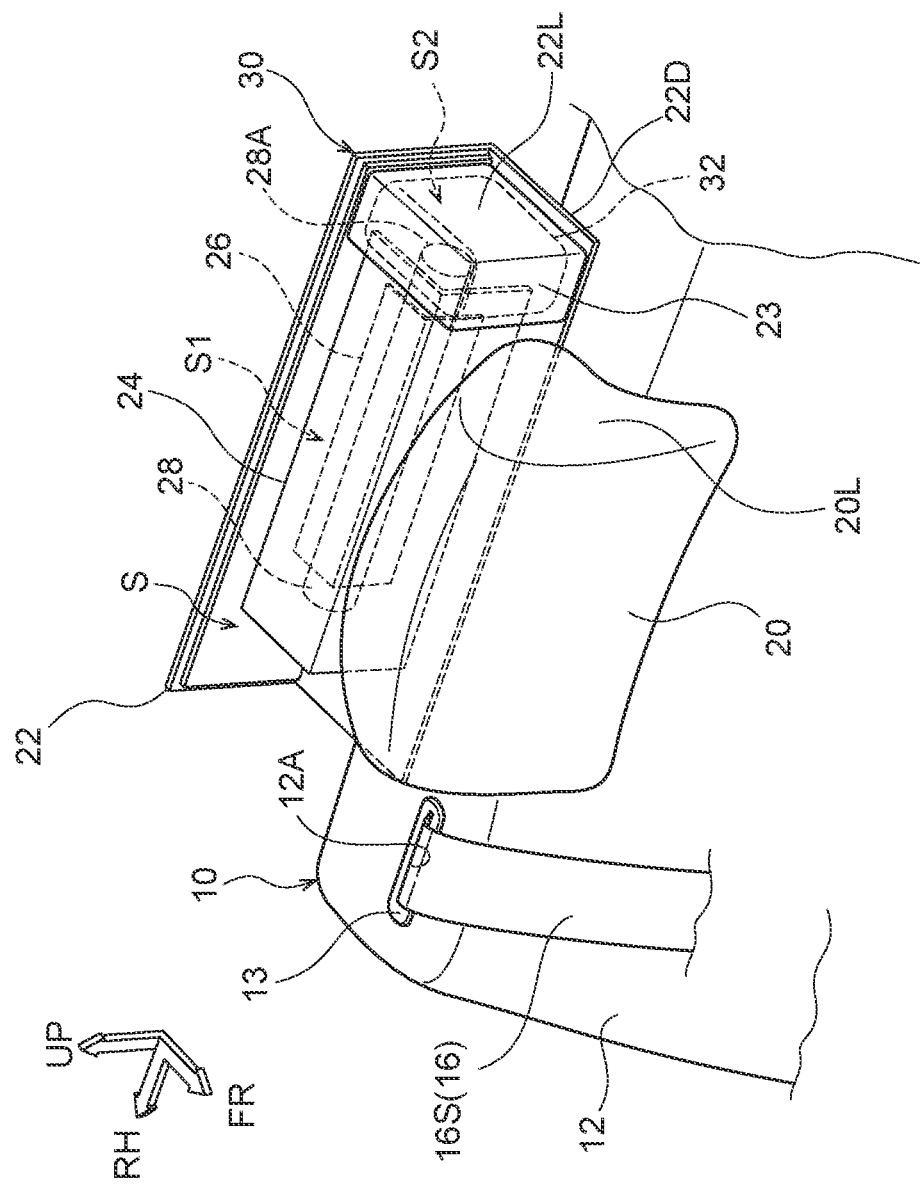
FIG. 2 is a perspective view illustrating relevant portions of a vehicle seat provided with a vehicle airbag device according to an exemplary embodiment.

First, explanation follows regarding the airbag device 30 according to a first exemplary embodiment. As illustrated in FIG. 1 and FIG. 2, the vehicle seat 10 includes a seat cushion (not illustrated in the drawings) on which the occupant P sits (which supports the buttocks and thighs of the occupant P), a seatback 12 that supports the back of the occupant P, and the headrest 20 that supports the head Ph of the occupant P.

A retractor 14, serving as a take-up device that takes up a seatbelt 16, is embedded in an upper section on the right side (one left-right direction side) of the seatback 12. A slit-shaped belt opening 12A for pulling the seatbelt 16 fed out from the retractor 14 toward the seat front side is formed in an upper end face on the right side of the seatback 12. A belt guide 13 that guides the seatbelt 16 is provided at a peripheral edge of the belt opening 12A.

A pre-tensioner mechanism is inbuilt in the retractor 14. In a vehicle head-on collision, the retractor 14 instantaneously takes up the seatbelt 16 so as to limit movement of the occupant P toward the front side due to force under inertia. Thus, the seatbelt device of the present exemplary embodiment is a pre-tensioner seatbelt device.

As illustrated in FIG. 1, a tongue plate 17 is attached to the seatbelt 16 so as to be capable of sliding. The tongue plate 17 is configured to as be capable of being detachably fitted into a buckle 18 provided on the left side (other left-right direction side) of the seat cushion. Note that in the following explanation, a part of the seatbelt 16 worn across a shoulder Ps of the occupant P is referred to as a shoulder belt 16S.

As illustrated in FIG. 1 and FIG. 2, the headrest 20 is provided at the seat width direction center of an upper end portion of the seatback 12 so as to be capable of being raised and lowered. A case 22 in the form of casing that is longer in the seat width direction than headrest 20 is provided at the rear side of the headrest 20. Note that, with the exception of a front wall 23 of a side section 22L, described later, the case 22 is covered by a similar covering to a covering that covers the headrest 20. However, this covering and a corresponding part of the case 22 is omitted from illustration in the drawings.

A predetermined space S (including a placement area S1 and a stowing area S2, described later) is formed inside the case 22. An inflator 28 is disposed in the placement area S1, serving as a part of the space S formed at the seat width direction center of the case 22. The inflator 28 is formed in a substantially circular cylindrical shape. An outer peripheral portion of the inflator 28 is supported by a reaction force-withstanding plate 24 formed as casing through a retainer 26, such that an axial center portion of the inflator 28 is disposed along the seat width direction.

The reaction force-withstanding plate 24 is for example fixed to a seatback frame (not illustrated in the drawings) through a bracket (not illustrated in the drawings) penetrating a bottom wall 22D of the case 22. The reaction force-withstanding plate 24 is configured so as to be able to withstand reaction force transmitted from an airbag body 32 (described later) through the inflator 28 when the airbag body 32 deploys toward the front side. Note that the reaction force-withstanding plate 24 and the retainer 26 are also disposed inside the placement area S1.

The inflator 28 is electrically connected to an airbag ECU (not illustrated in the drawings) provided to the vehicle. The airbag ECU is electrically connected to a detection device (not illustrated in the drawings) including a collision detection sensor (acceleration sensor) and so on provided to the vehicle. Thus, in a case in which a vehicle head-on collision is detected by the detection device, the inflator 28 is actuated through the airbag ECU so as to instantaneously eject gas.

Note that instead of being configured so as to actuate when a vehicle head-on collision is detected, the inflator 28 may be configured so as to actuate when a vehicle head-on collision is predicted by a detection device including a collision prediction sensor (not illustrated in the drawings) and so on. A connection portion (not illustrated in the drawings) of the airbag body 32 is fitted into and connected to an ejection outlet 28A of the inflator 28.

The left side (seat width direction inside) of the case 22 is configured by the side section 22L that has a rectangular case shape and juts out further toward the left side than a left-side end face 20L of the headrest 20 in face-on view. The airbag body 32 of the airbag device 30 is stowed in a rolled-up state (outward rolled state) in the stowing area S2 formed in the side section 22L and configuring the remaining area of the space S.

Note that in order to simplify the drawing, the rolled-up shape of the airbag body 32 is omitted in FIG. 2. Moreover, in the following explanation, a section of the airbag body 32 that remains housed in the side section 22L of the airbag body 32 (a section that does not project out from the side section 22L; see FIG. 18) is referred to as a base section 32A, and a connection section of the airbag body 32 that is connected to the ejection outlet 28A of the inflator 28 is referred to as a fixed point 32B (see FIG. 18).

Figure 3:
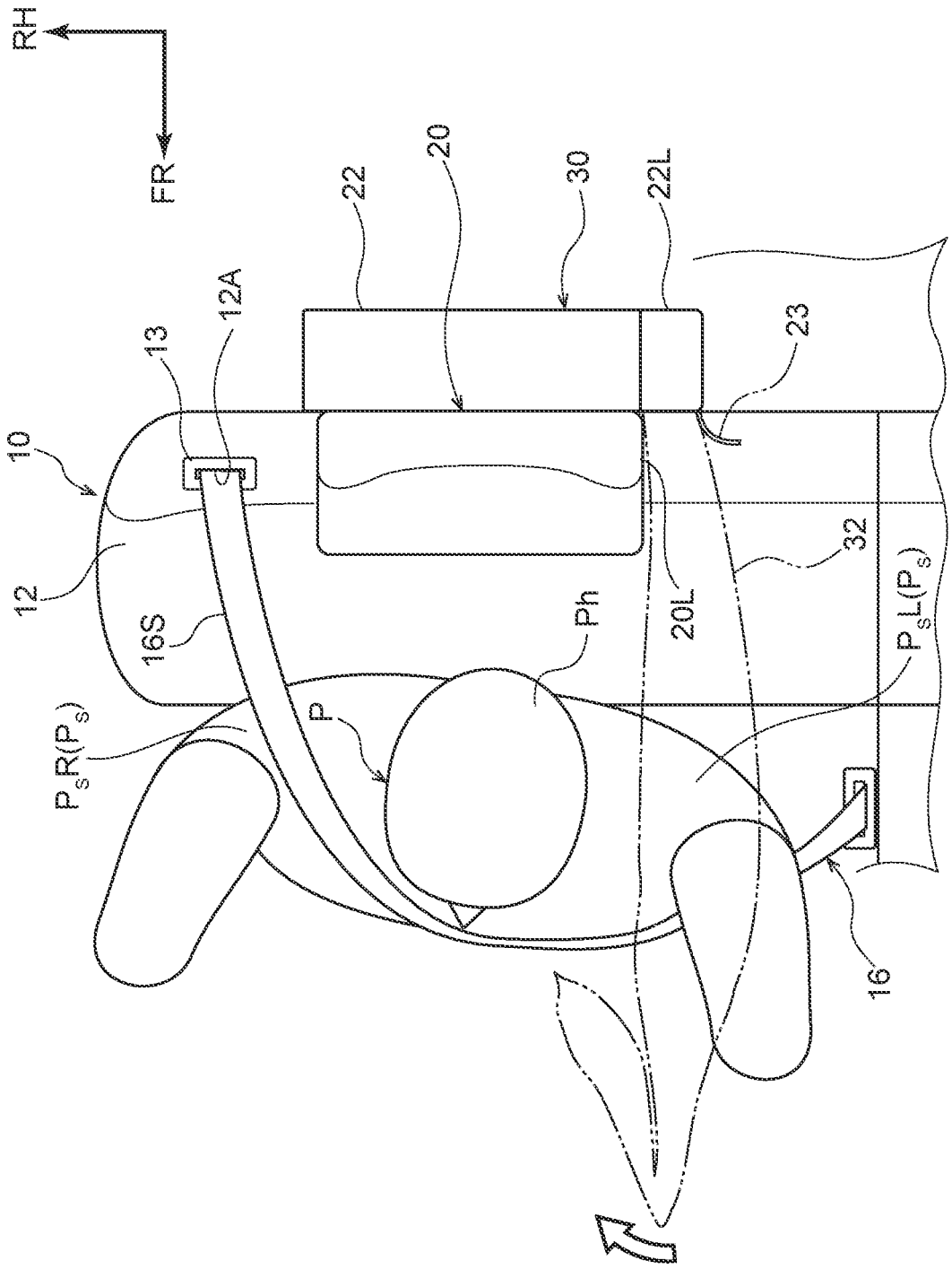
FIG. 3 is a plan view illustrating an airbag body of a vehicle airbag device according to a first exemplary embodiment during deployment.

As illustrated in FIG. 3, the airbag device 30 includes the airbag body 32 that deploys when gas is ejected from the inflator 28 by passing the left side of the head Ph of the occupant P seated in the vehicle seat 10 and unraveling from its rolled shape toward the front side. Note that the left side of the head Ph of the occupant P seated in the vehicle seat 10 refers to a space at a position that has substantially left-right symmetry relative to a position of the belt guide 13 of the shoulder belt 16S on the opposite side of the headrest 20 (the head Ph of the occupant P) (namely, with respect to a center line of the vehicle seat).

Figure 4:
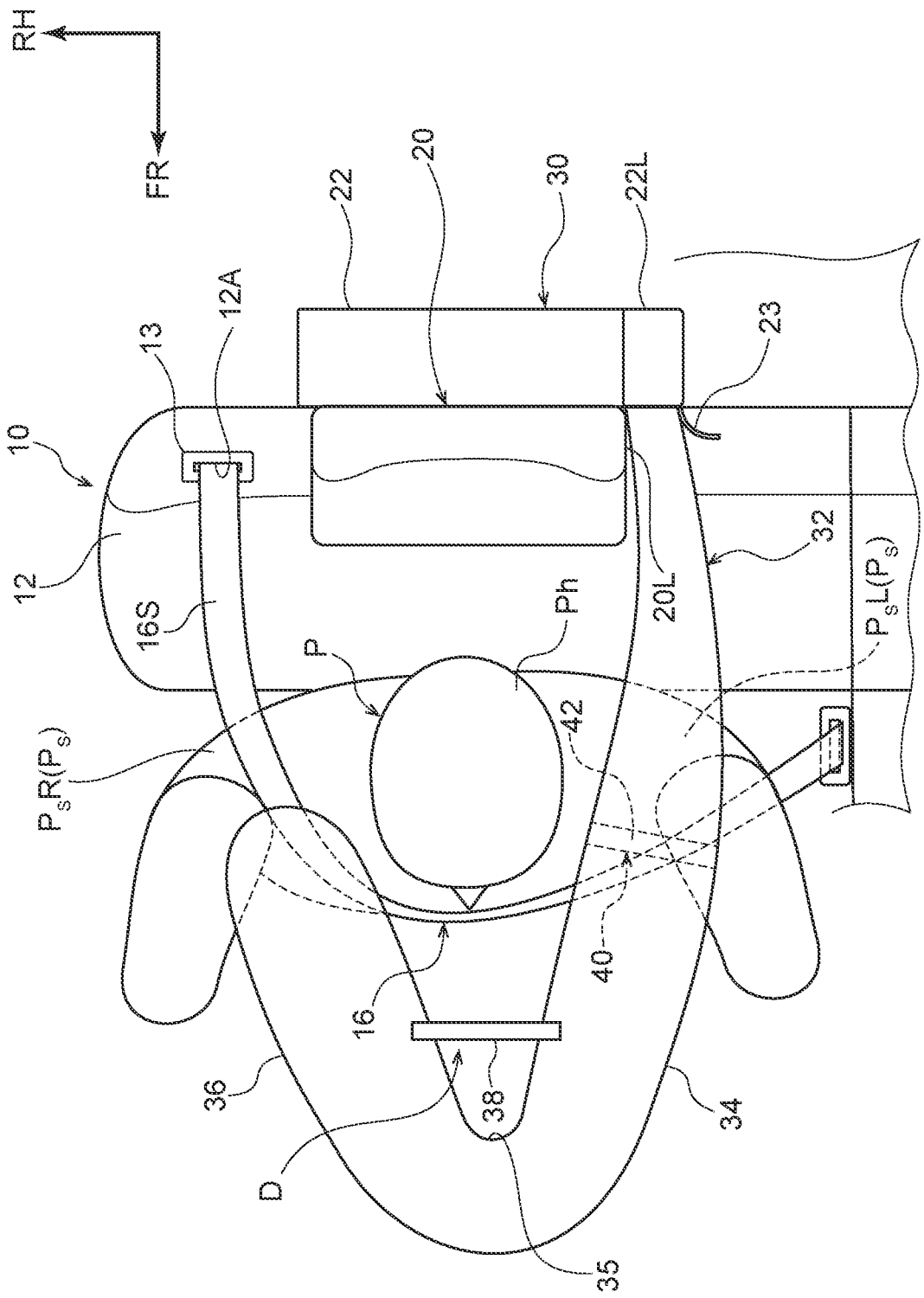
FIG. 4 is a plan view illustrating an airbag body of a vehicle airbag device according to the first exemplary embodiment directly after deployment is complete.
Figure 5:
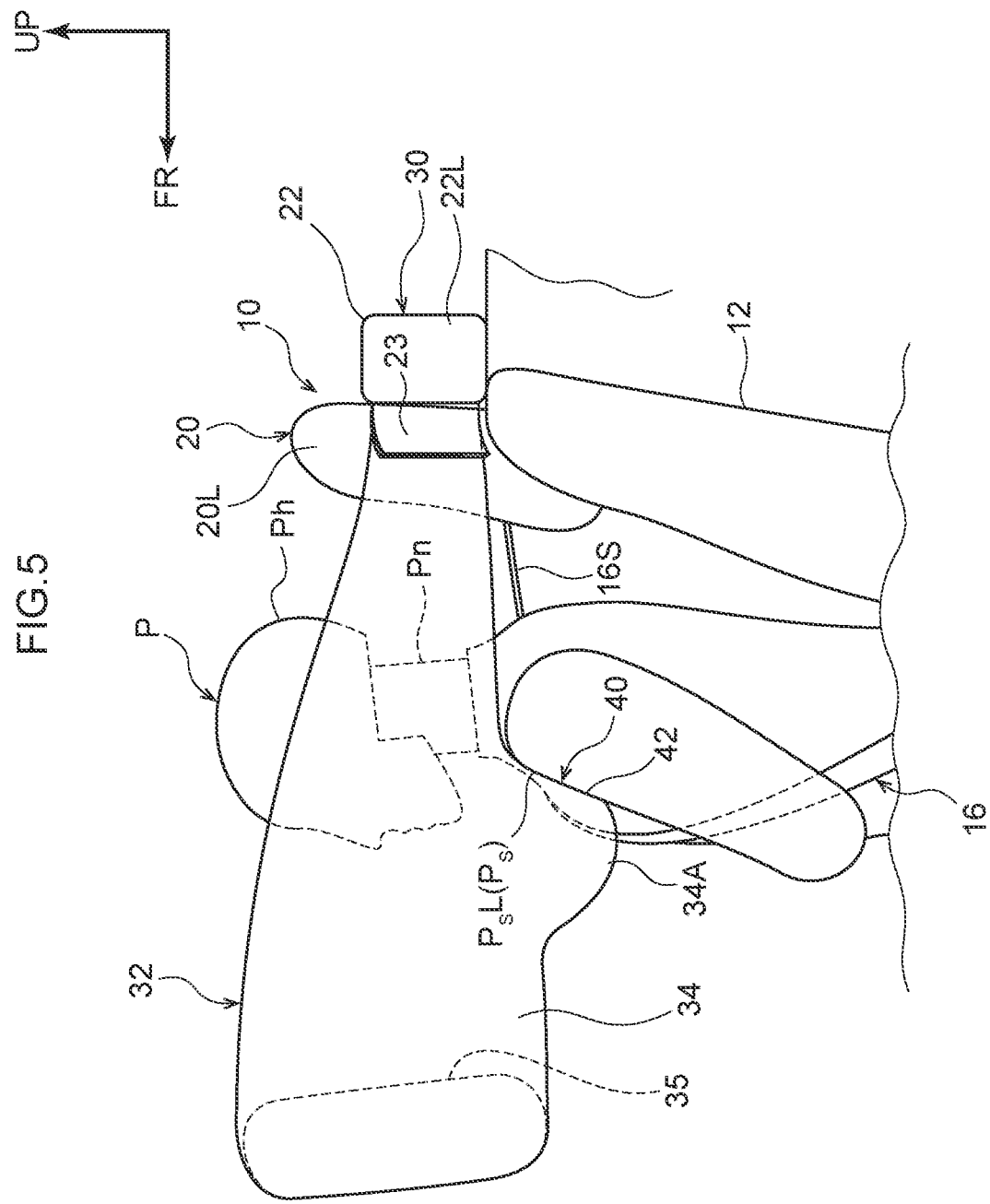
FIG. 5 is a side view illustrating an airbag body of a vehicle airbag device according to the first exemplary embodiment directly after deployment is complete.

As illustrated in FIG. 4 and FIG. 5, the airbag body 32 includes a front-rear chamber 34 disposed at one side (the left side in the present exemplary embodiment) of the head Ph of the occupant P, and a leading end chamber 36 that deploys toward the seat width direction inner side from a front side end portion of the front-rear chamber 34 so as to be disposed at the front side (the front-right side in the present exemplary embodiment) of the head Ph (face) of the occupant P.

The airbag body 32 also includes a belt-shaped tether 38 that couples between a predetermined position at an upper end portion of the front-rear chamber 34 and a predetermined position at an upper end portion of the leading end chamber 36. Namely, the airbag body 32 is deployed in a state bent into a substantially "V" shape in plan view, and with the exception of a shoulder-contact section 40 (extension section 34A), described later, airbag body 32 is disposed at the upper side of the shoulders Ps of the occupant P so as to be capable of restraining at least the head Ph of the occupant P.

Note that although it is sufficient that the tether 38 is provided so as to couple between at least the upper end portion of the front-rear chamber 34 and the upper end portion of the leading end chamber 36, another tether may for example be provided so as to couple between a predetermined position at a lower end portion of the front-rear chamber 34 and a predetermined position at a lower end portion of the leading end chamber 36. The tether 38 is only illustrated in FIG. 4, and is omitted from illustration in FIG. 7, FIG. 12, and FIG. 15, described later.

Figure 18:
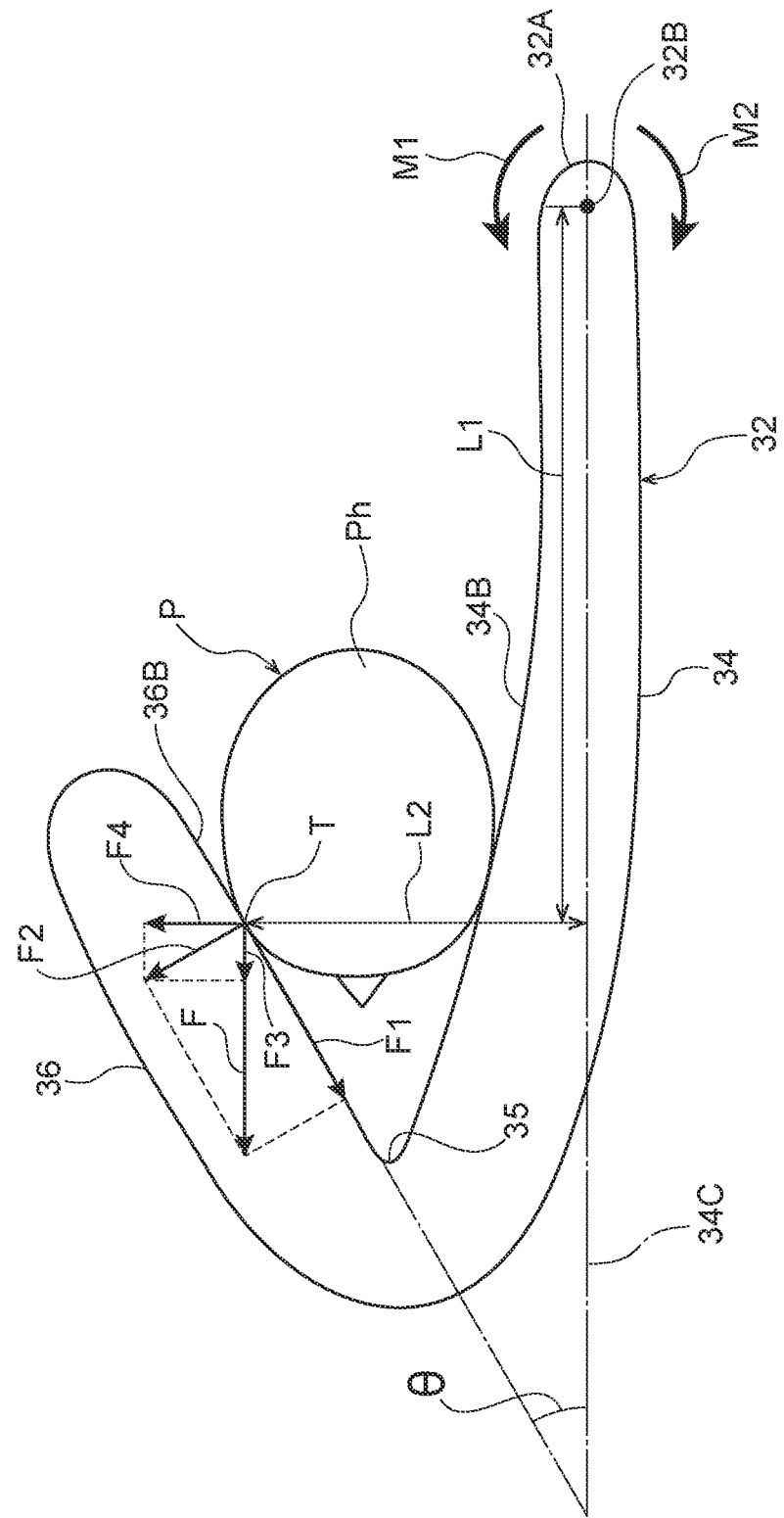
FIG. 18 is a schematic diagram for explaining an angle of inclination formed between a front-rear chamber and a leading end chamber configuring an airbag body of a vehicle airbag device according to an exemplary embodiment, and rotation-inducing moment acting on the airbag body.

Explanation follows regarding an angle of inclination θ of the leading end chamber 36 with respect to the front-rear chamber 34 and a rotation-inducing moment acting on the airbag body 32, with respect to FIG. 18 and FIG. 19. In plan view, a seat width direction central line running through the front-rear chamber 34 in the front-rear direction is referred to as a central axis line 34C, and a face of the leading end chamber 36 that opposes the head Ph is referred to as a head-restraining face 36B. As illustrated in FIG. 18, the angle of inclination θ of the head-restraining face 36B of the leading end chamber 36 with respect to the central axis line 34C of the front-rear chamber 34 is set as an acute angle (for example between 20° and 40°).

In a case in which the head Ph of the occupant P contacts the head-restraining face 36B of the leading end chamber 36 and a head-restraining face 34B, this being a face of the front-rear chamber that opposes the head Ph, under force due to inertia generated in a vehicle head-on collision, load is input to the head-restraining face 34B and the head-restraining face 36B from the head Ph. If a load F input to the head-restraining face 36B is considered out of the load input to the head-restraining face 34B and the head-restraining face 36B, this load F can be broken down into a load F1 input along the head-restraining face 36B, and a load F2 input in a direction normal to the head-restraining face 36B.

There is sufficient friction between the head Ph of the occupant P and the head-restraining face 36B that the head Ph does not slide along the head-restraining face 36B. Thus, the load F1 is cancelled out by this friction force between the head Ph and the head-restraining face 36B. The load F2 input in a direction normal to the head-restraining face 36B can be broken down into a load F3 along the front-rear direction, and a load F4 along the seat width direction (left-right direction).

Note that a distance along the front-rear direction from the fixed point 32B at the base section 32A of the airbag body 32 to a contact point T where the head Ph of the occupant P contacts the head-restraining face 36B is referred to as a distance L1, and a shortest distance from the central axis line 34C of the front-rear chamber 34 to the contact point T is referred to as a distance L2. When the head Ph of the occupant P contacts the head-restraining face 36B of the leading end chamber 36, a rotation-inducing moment M1

(M1=F3×L2) that causes the airbag body 32 to rotate in a direction away from the occupant P occurs at the fixed point 32B of the airbag body 32.

However, since the head-restraining face 36B of the leading end chamber 36 is set at the angle of inclination θ, this being an acute angle with respect to the central axis line 34C of the front-rear chamber 34 as described above, a rotation-inducing moment M2 (M2=F4×L1) that causes the airbag body 32 to rotate in the opposite direction to the rotation-inducing moment M1 can be generated at the fixed point 32B.

Namely, in this airbag body 32, the airbag body 32 can be made to rotate toward the head Ph side of the occupant P (in the opposite direction to the direction away from the head Ph). Note that as illustrated in FIG. 19, the angle of inclination θ of the head-restraining face 36B of the leading end chamber 36 with respect to the central axis line 34C of the front-rear chamber 34 is, in some embodiments, set to 30°, at which the rotation-inducing moment M2 is at a maximum.

As illustrated in FIG. 4 and FIG. 5, the airbag body 32 includes the shoulder-contact section 40 that contacts from the front side the left side (other side) shoulder PsL of the occupant P on the opposite side in the left-right direction to the right side (one side) shoulder PsR across which the shoulder belt 16S is worn so as to restrain the left shoulder PsL of the occupant P by relatively pressing the left shoulder PsL toward the seatback 12.

The shoulder-contact section 40 is configured by a rear face of the extension section 34A that has a substantially triangular conical shape extending integrally toward the lower side from a lower end portion (lower end face) on the base section 32A side of the front-rear chamber 34 when the front-rear chamber 34 has been inflated and deployed. This rear face configures a planar-shaped first shoulder-restraining face 42. The shoulder-contact section 40 abuts the left shoulder PsL of the occupant P from the front side directly after the front-rear chamber 34 has been deployed (prior to completing deployment of the leading end chamber 36), such that the shoulder PsL of the occupant P is restrained by the seatback 12.

Thus, as illustrated in FIG. 3, in a case in which the vehicle is in a head-on collision, first, the right shoulder PsR of the occupant P is pressed from the front side by the shoulder belt 16S, after which the left shoulder PsL of the occupant P is pressed from the front side by the shoulder-contact section 40 formed to the front-rear chamber of the deployed airbag body 32.

Then, when inflation and deployment of the airbag body 32 is complete, the shoulder-contact section 40 integrally formed to the base section 32A side of the front-rear chamber 34 abuts the left shoulder PsL of the occupant P from the front side, such that a boundary section 35 (bent-back section) between the front-rear chamber 34 and the leading end chamber 36 is retained at the front side of the head Ph of the occupant P.

Namely, the front-rear chamber 34 extends further toward the front side at a deployment direction downstream side of the shoulder-contact section 40 than at a deployment direction upstream side of the shoulder-contact section 40, such that a gap D is formed between the head Ph (face) of the occupant P and the front-rear chamber 34, the leading end chamber 36, and the boundary section 35 (see FIG. 4, FIG. 7, FIG. 12, and FIG. 15). Thus, the airbag body 32 is configured so as not to contact the face of the occupant P as long as the occupant P does not move greatly toward the front side under force due to inertia.

The front wall 23, serving as a lid configuring a front end face of the side section 22L of the case 22, is for example configured so as to split in a straight line along the vertical direction accompanying deployment of the airbag body 32. In some embodiments, the split location is at a right end portion (seat width direction inside end portion) of the front wall 23. In other words, in some embodiments, a weakened portion or the like that splits easily is formed at the right end portion of the front wall 23.

When the split location is at the right end portion of the front wall 23 (when a weakened portion or the like that splits easily is formed at the right end portion of the front wall 23), the front wall 23 opens with a left end portion serving as a hinge portion, thereby enabling the deploying airbag body 32 to be suppressed or prevented from contacting the head of an occupant (not illustrated in the drawings) seated at the center of the rear seating. Note that the front wall 23 is disposed at a position that has substantially left-right symmetry relative to the position of the belt guide 13 on the other side of the headrest 20 (head Ph of the occupant P) (namely, with respect to the center line of the vehicle seat).

Figure 6:
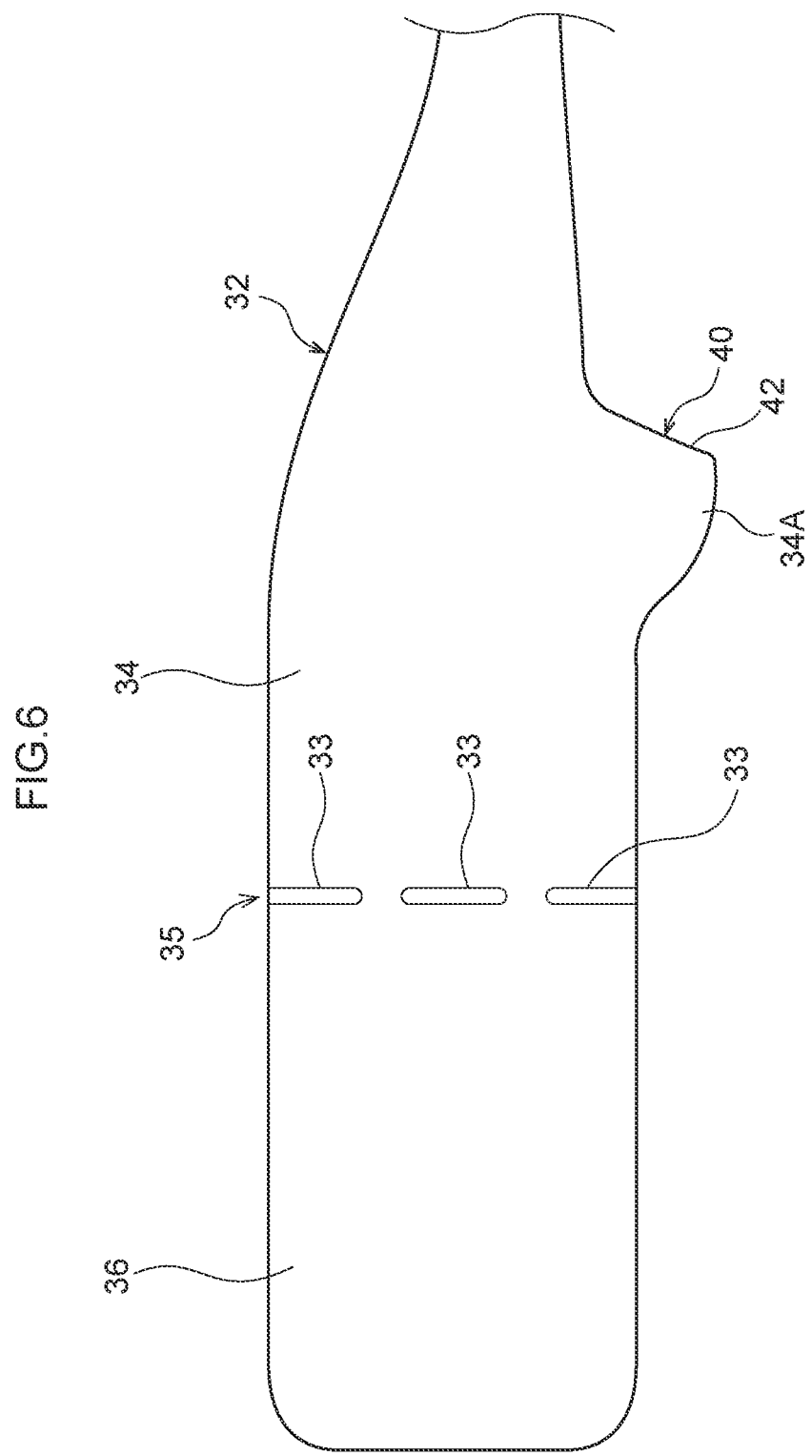
FIG. 6 is an opened-out view illustrating an airbag body of a vehicle airbag device according to the first exemplary embodiment.

As illustrated in FIG. 6, in a state unfilled with gas, three non-inflating portions 33 that extend along the vertical direction are formed by stitching at predetermined intervals in the vertical direction at a substantially front-rear direction central portion of the airbag body 32. Each of the non-inflating portions 33 is formed in a substantially elliptical shape with its length direction along the vertical direction.

As a result of forming the respective non-inflating portions 33, the leading end chamber 36 is capable of bending toward the seat width direction inside with respect to the front-rear chamber 34, and is capable of deploying toward the seat width direction inside. Namely, a section of the airbag body 32 further toward the deployment direction upstream side than the non-inflating portions 33 configures the front-rear chamber 34, whereas a section further toward the deployment direction downstream side than the non-inflating portions 33 configures the leading end chamber 36.

Next, explanation follows regarding operation of the airbag device 30 according to the first exemplary embodiment configured as described above.

In a case in which the detection device detects that the vehicle is involved in a head-on collision, the inflator 28 is actuated such that gas is instantaneously ejected into the airbag body 32. When gas is ejected into the airbag body 32, the front wall 23 of the side section 22L splits as a result of the airbag body 32 being deployed (as a result of being pressed from the inside by the airbag body 32). The airbag body 32 then passes the left side of the head Ph of the occupant P and deploys toward the front side from the side section 22L.

More specifically, in a case in which the inflator 28 is actuated in a vehicle head-on collision, the front-rear chamber 34 of the airbag body 32 passes the left side of the head Ph of the occupant P and deploys toward the front side so as to be disposed at the left side of the head Ph of the occupant P. Then, the leading end chamber 36 of the airbag body 32 deploys toward the seat width direction inner side from a seat front side end portion of the front-rear chamber 34 so as to be disposed at the front-right side of the head Ph (face) of the occupant P.

At least the head Ph of the occupant P seated in the vehicle seat 10 and attempting to move toward the front side under force due to inertia is restrained by the airbag body 32 (front-rear chamber 34 and leading end chamber 36) disposed in this manner. Namely, even if the head Ph of the occupant P moves greatly toward the front side under force due to inertia, the head Ph can be restrained by the airbag body 32 (front-rear chamber 34 and leading end chamber 36).

Moreover, since the head-restraining face 36B of the leading end chamber 36 is set at the angle of inclination θ (such as θ=30°) that is an acute angle with respect to the central axis line 34C of the front-rear chamber 34, the rotation-inducing moment M2 that causes the airbag body 32 to rotate in the opposite direction to the rotation-inducing moment M1 can be generated at the fixed point 32B.

Namely, in this airbag body 32, the airbag body 32 can be made to rotate toward the head Ph of the occupant P (in the opposite direction to the direction away from the head Ph). Thus, in a vehicle head-on collision, the head Ph of the occupant P attempting to move toward the front side under force due to inertia can be covered so as to be surrounded by the airbag body 32, thereby enabling ineffectual restraint of the head Ph to be suppressed or prevented.

Moreover, there is more space at the side of the head Ph of the occupant P than at the side (alongside a side section) of the seatback 12. Thus, there is less of a limit on space than when an airbag (not illustrated in the drawings) is deployed toward the front side from the side section of the seatback 12, thereby enabling the airbag body 32 (front-rear chamber 34 and leading end chamber 36) to be deployed at an early stage.

Moreover, the side where the airbag body 32 is deployed is the opposite side in the left-right direction to the belt guide 13 (belt opening 12A), such that deployment of the airbag body 32 is unaffected by the shoulder belt 16S. Thus, the airbag device 30 according to the present exemplary embodiment can easily be applied not only to the rear seating of the vehicle, but also to a front seat.

Moreover, directly after the front-rear chamber 34 has deployed (prior to completion of deployment of the leading end chamber 36), the shoulder-contact section 40 of the airbag body 32 contacts from the front side the left shoulder PsL on the opposite side in the left-right direction to the right shoulder PsR of the occupant P across which the shoulder belt 16S is worn, such that the left shoulder PsL of the occupant P is relatively pressed toward the seatback 12 and thereby restrained.

Note that, accompanying forward movement of the occupant P in a vehicle head-on collision, the right shoulder PsR restrained by the shoulder belt 16S bears load from the shoulder belt 16S, such that the head Ph and left shoulder PsL of the occupant P attempt to rotate about an axis with its rotation axial direction in the vertical direction. Namely, the head Ph and left shoulder PsL of the occupant P attempt in rotate in a clockwise direction in plan view.

However, when this occurs, the left shoulder PsL of the occupant P bears load toward the rear side from the airbag body 32 (at least the front-rear chamber 34) through the shoulder-contact section 40, such that the head Ph and left shoulder PsL of the occupant P are effectively made to rotate in the opposite direction (in a counterclockwise direction in plan view). This enables rotational forces applied to the head Ph of the occupant P to cancel each other out.

Namely, involuntary rotation of the head Ph of the occupant P can be effectively suppressed, thereby enabling the head Ph of the occupant P to be effectively restrained. This enables the likelihood of the head of the occupant P incurring a rotational injury to be reduced, and enables torsion force arising at the neck Pn of the occupant P to be reduced, in a vehicle head-on collision.

Moreover, the shoulder-contact section 40 includes the first shoulder-restraining face 42 that extends toward the lower side from the lower end portion (lower end face) of the front-rear chamber 34 of the airbag body 32. Note that the front-rear chamber 34 is deployed prior to the leading end chamber 36. This enables the shoulder-contact section 40 to be deployed at an early stage, such that the likelihood of the head of the occupant P incurring a rotational injury can be even more effectively reduced in a vehicle head-on collision.

Moreover, the shoulder-contact section 40 (first shoulder-restraining face 42) only contacts a front surface of the left shoulder PsL of the occupant P and does not press the left arm of the occupant P. This enables the occupant P to be restrained with a good left-right balance by the shoulder-contact section 40 together with the shoulder belt 16S that contacts a front surface of the right shoulder PsR of the occupant P so as to restrain the shoulder PsR.

Thus, even if the head Ph of the occupant P moves toward the front side under force due to inertia, a contact force with which the head Ph of the occupant P contacts the airbag body 32 can be alleviated. Namely, a situation in which the head Ph (face) of the occupant P violently strikes the airbag body 32 can be avoided. This enables torsion force arising at the neck Pn of the occupant P to be even more effectively reduced.

As described above, the front wall 23 is configured to open with the left end portion acting as a hinge portion when the airbag body 32 is deployed. Thus, the deploying airbag body 32 can be suppressed or prevented by the front wall 23 from contacting the head (face) of an occupant (not illustrated in the drawings) seated in the central vehicle seat (not illustrated in the drawings) of the rear seating.

Moreover, the front wall 23 that opens when the airbag body 32 is deployed is provided at a position that has substantially left-right symmetry relative to the position of the belt guide 13, which guides the shoulder belt 16S at a position corresponding to the right shoulder PsR of the occupant P, on the other side of the headrest 20 (head Ph of the occupant P) (namely, with respect to the center line of the vehicle seat). As illustrated in FIG. 1, this improves the left-right balance of the vehicle seat 10 to give a more favorable appearance.

Second Exemplary Embodiment

Next, explanation follows regarding an airbag device 30 according to a second exemplary embodiment. Note that locations that are equivalent to those in the first exemplary embodiment are allocated the same reference numerals, and detailed explanation thereof (including common operation) is omitted as appropriate.

Figure 7:
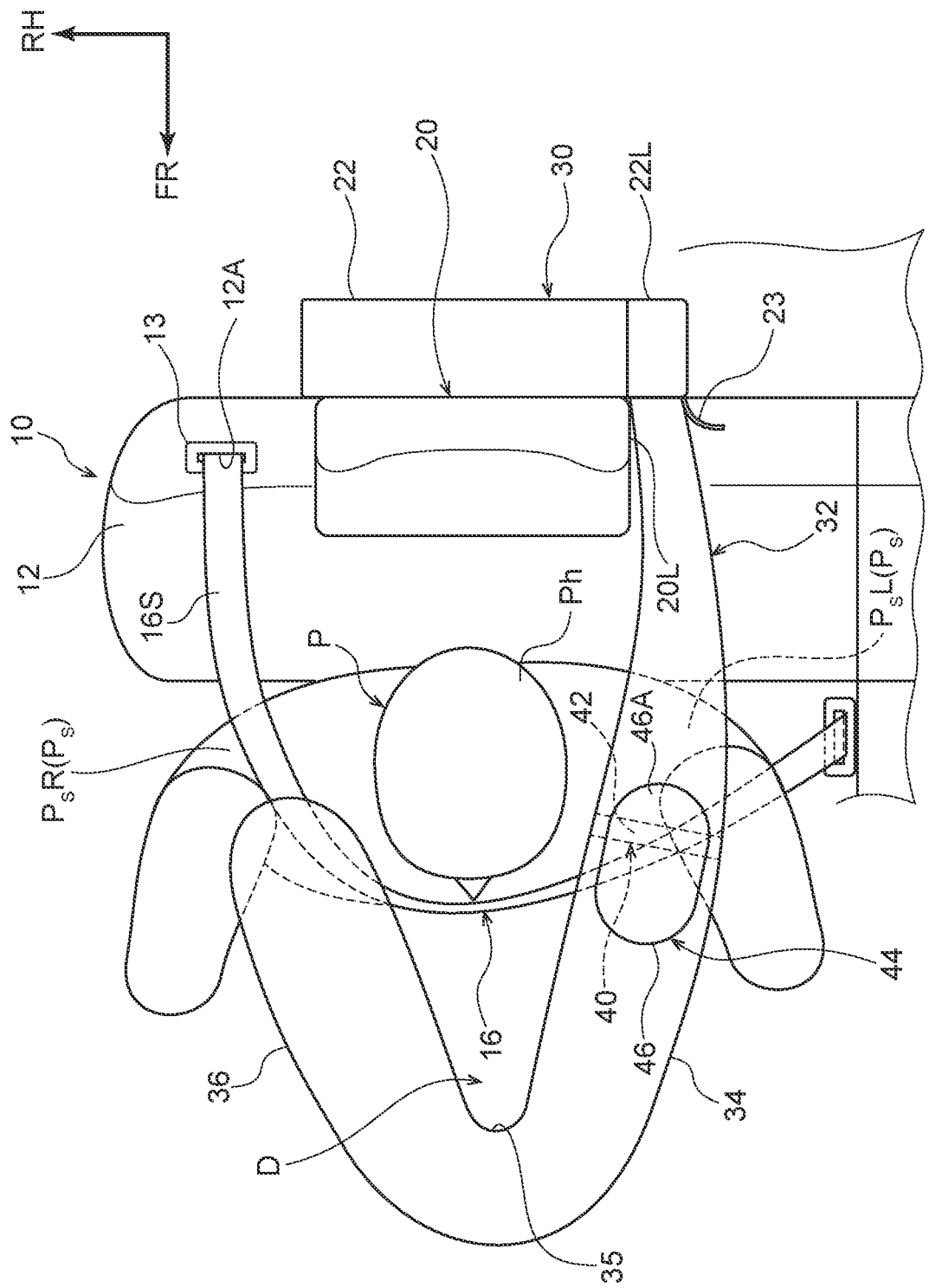
FIG. 7 is a plan view illustrating an airbag body of a vehicle airbag device according to a second exemplary embodiment directly after deployment is complete.
Figure 8:
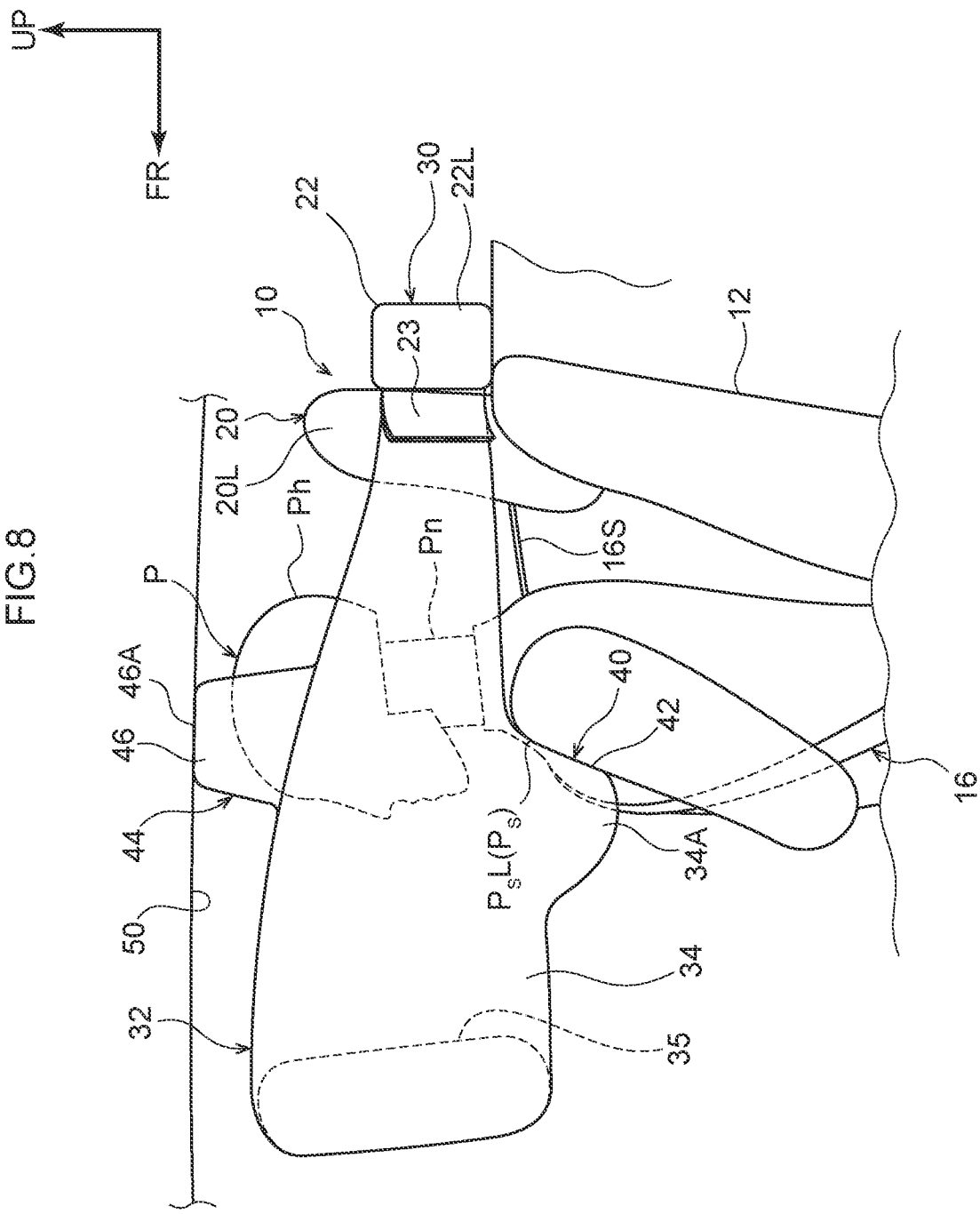
FIG. 8 is a side view illustrating an airbag body of a vehicle airbag device according to the second exemplary embodiment directly after deployment is complete.

As illustrated in FIG. 7 and FIG. 8, the airbag body 32 of the airbag device 30 according to the second exemplary embodiment only differs from the first exemplary embodiment in the respect that it includes a ceiling-abutment section 44 that abuts a ceiling 50 of the vehicle cabin.

In some embodiments, the ceiling-abutment section 44 is formed in a block shape on the base section 32A side of the front-rear chamber 34 so as to hit the ceiling 50 as early as possible when the front-rear chamber 34 is inflated and deployed. In the present exemplary embodiment, the ceiling-abutment section 44 is configured of a substantially elliptical column-shaped first projecting section 46 that extends integrally toward the upper side from an upper end portion (upper end face) of the front-rear chamber 34 at a location corresponding to the shoulder-contact section 40.

Figure 9:
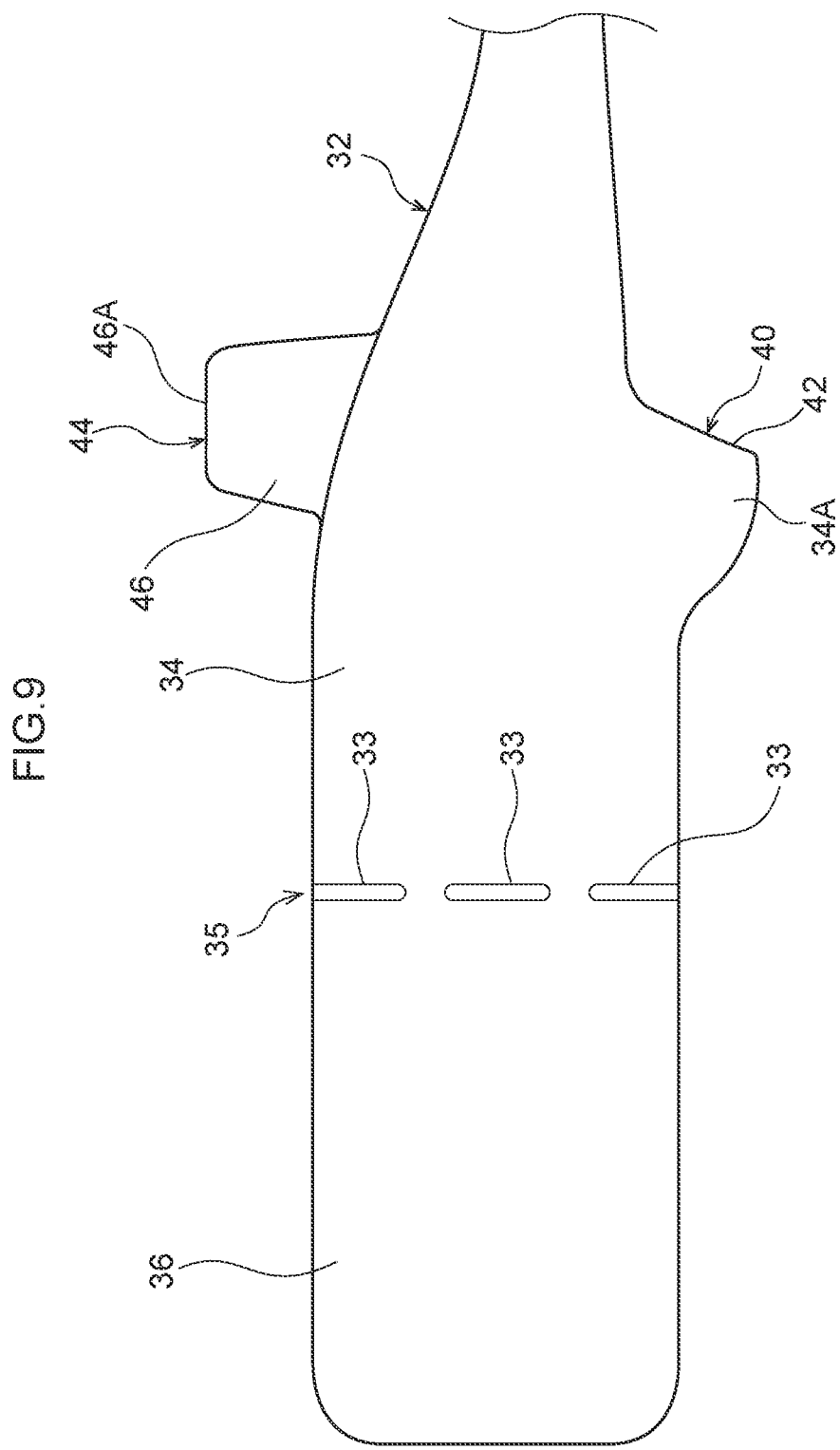
FIG. 9 is an opened-out view illustrating an airbag body of a vehicle airbag device according to the second exemplary embodiment.

More specifically, as illustrated in FIG. 9, the shoulder-contact section 40 and the first projecting section 46 are formed at substantially the same position in the front-rear direction (the deployment direction of the front-rear chamber 34). In other words, as illustrated in FIG. 7, the first projecting section 46 is formed at a position where at least a part thereof overlaps the shoulder-contact section 40 in plan view.

Figure 10:
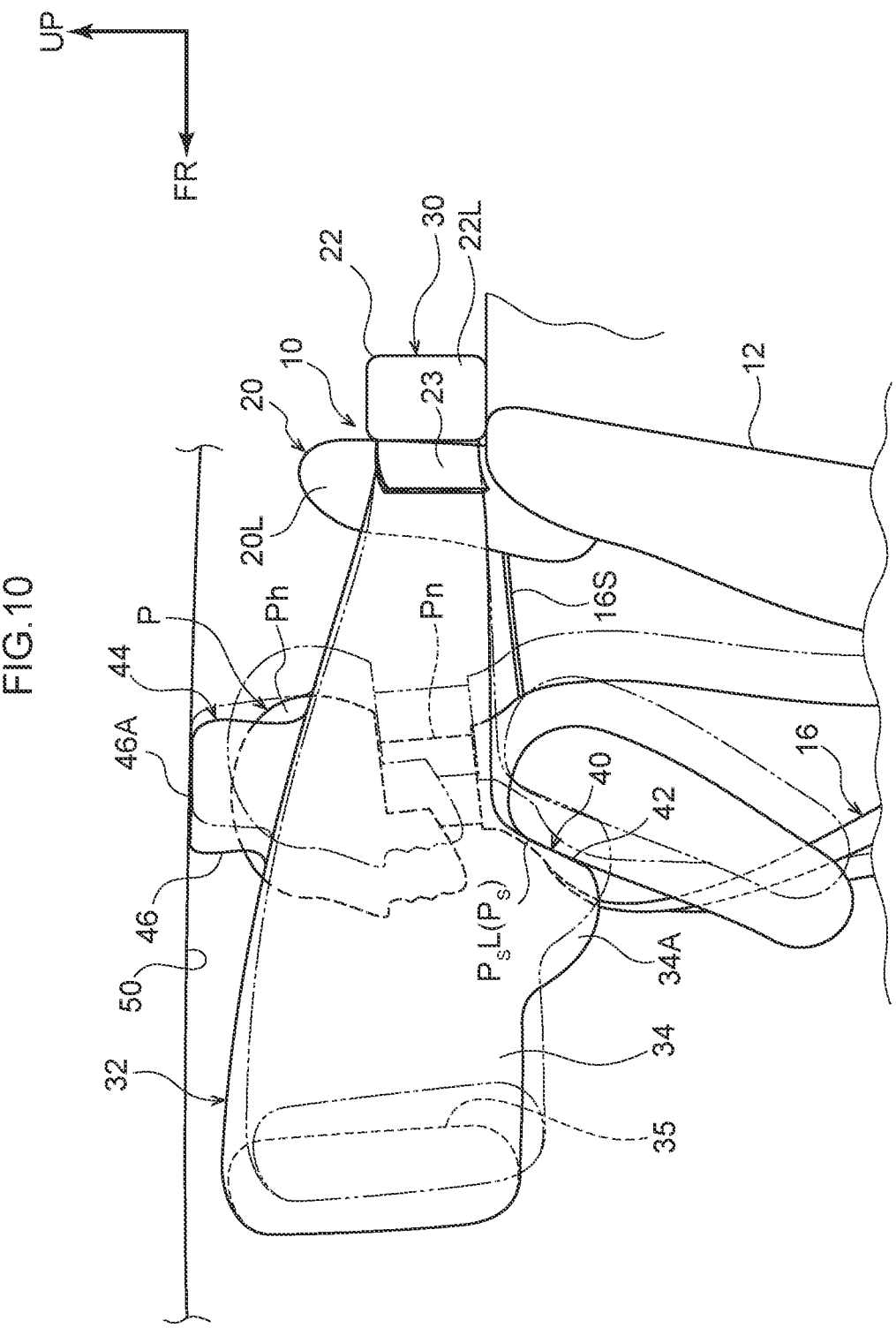
FIG. 10 is a side view illustrating behavior of an occupant and of an airbag body of a vehicle airbag device according to the second exemplary embodiment directly after deployment is complete.

As illustrated in FIG. 10, a situation in which the left shoulder PsL of the forward-moving occupant P strikes the shoulder-contact section 40 in a vehicle head-on collision, such that the airbag body 32 is pressed forward (so as to shift from the state illustrated by phantom lines to the state illustrated by solid lines), and the boundary section 35 of the airbag body 32 attempts to rotate toward the upper side with the base section 32A of the airbag body 32 as a center of rotation in side view viewed along the vehicle width direction (seat width direction), can be suppressed or prevented by the ceiling-abutment section 44 (first projecting section 46).

Namely, as illustrated by the solid lines in FIG. 10, an upper end face 46A of the first projecting section 46 abuts the ceiling 50, such that the first projecting section 46 (ceiling-abutment section 44) bears reaction force from the ceiling 50. This suppresses rotation toward the upper side with the base section 32A side of the airbag body 32 as a center of rotation, thereby enabling the boundary section 35 of the airbag body 32 to be suppressed from riding up toward the upper-front side, and the chest of the occupant P to be suppressed from pivoting toward the lower side.

This enables a change to a relative positional relationship between the head Ph and the chest of the occupant P to be suppressed, thereby enabling the likelihood of the head of the occupant P incurring a rotational injury to be reduced and enabling an injury severity score for the neck Pn of the occupant P (torsion force arising at the neck Pn) to be reduced, in a vehicle head-on collision.

Figure 11:
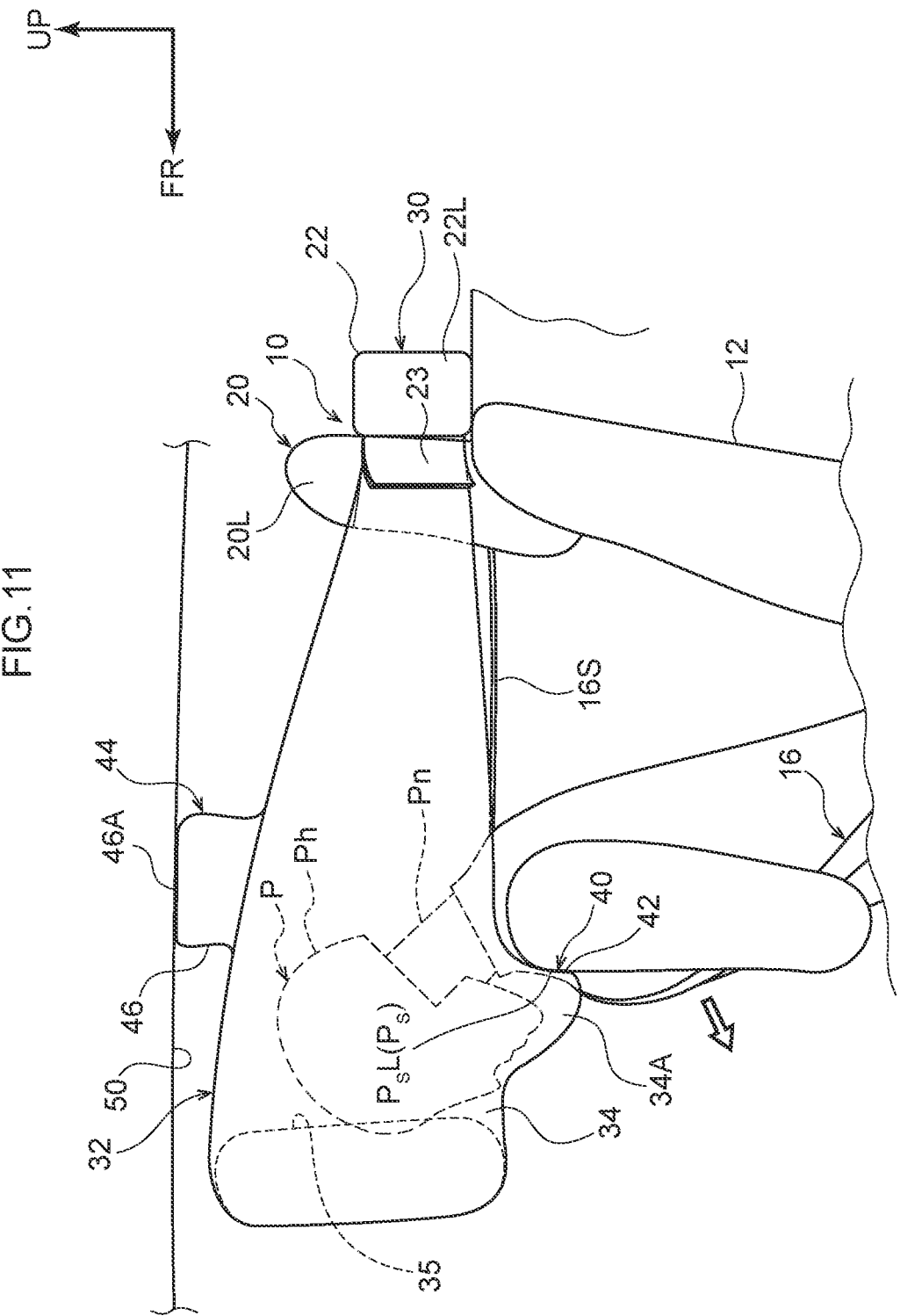
FIG. 11 is a side view illustrating ultimate behavior of an occupant after deployment of a vehicle airbag device according to the second exemplary embodiment.

Thus, even if the head Ph of the occupant P moves greatly toward the front side under force due to inertia in a vehicle head-on collision as illustrated in the example in FIG. 11, the head Ph of the occupant P can be effectively restrained by the airbag body 32 (front-rear chamber 34 and leading end chamber 36) without the airbag body 32 dislodging toward the upper side away from the head Ph of the occupant P.

Third Exemplary Embodiment

Next, explanation follows regarding an airbag device 30 according to a third exemplary embodiment. Note that locations that are equivalent to those in the first exemplary embodiment or second exemplary embodiment are allocated the same reference numerals, and detailed explanation thereof (including common operation) is omitted as appropriate.

Figure 12:
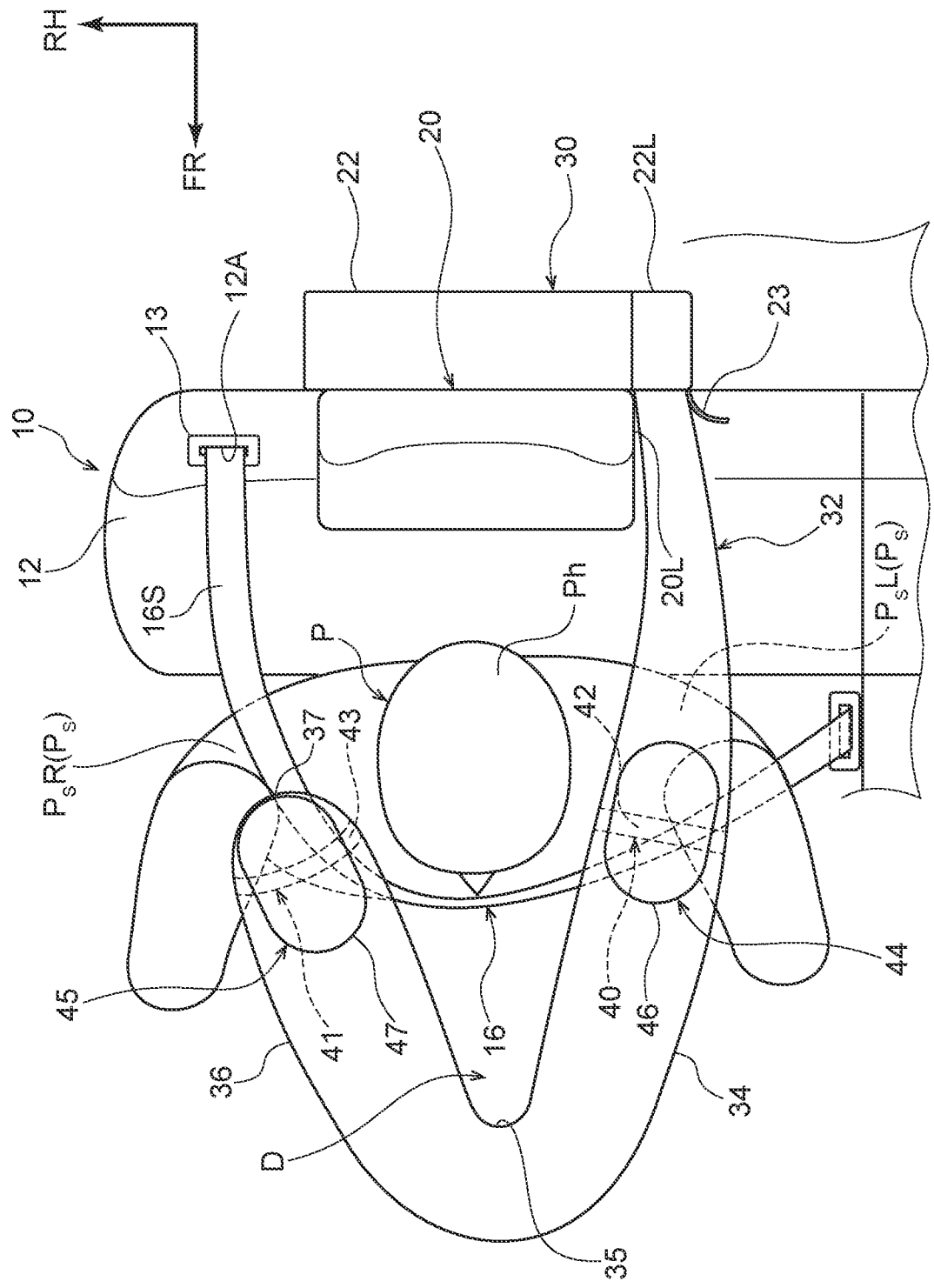
FIG. 12 is a plan view illustrating an airbag body of a vehicle airbag device according to a third exemplary embodiment directly after deployment is complete.
Figure 13:
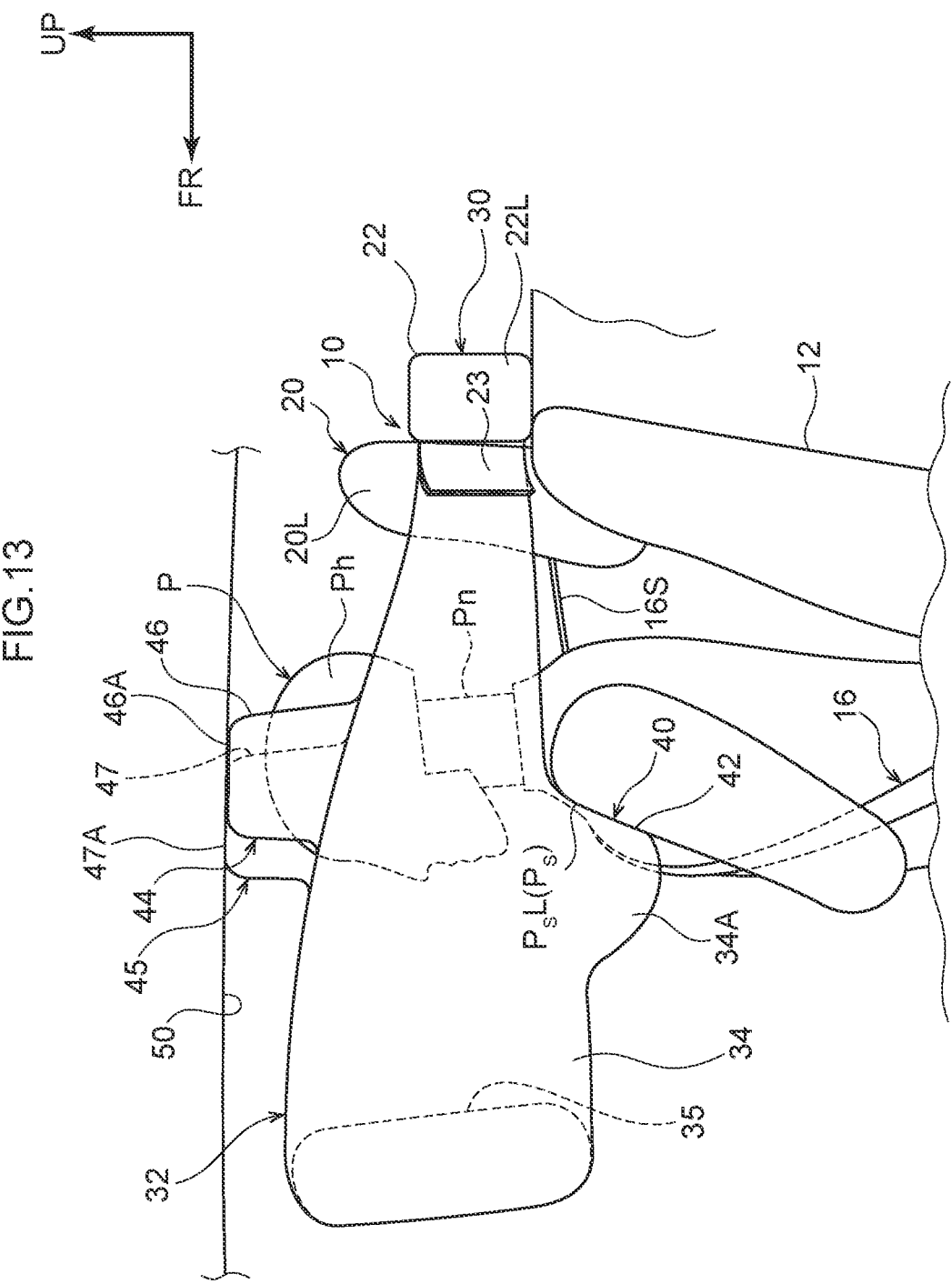
FIG. 13 is a side view illustrating an airbag body of a vehicle airbag device according to the third exemplary embodiment directly after deployment is complete.

As illustrated in FIG. 12 and FIG. 13, the airbag body 32 of the airbag device 30 according to the third exemplary embodiment only differs from the second exemplary embodiment in the respect that it includes an auxiliary shoulder-contact section 41 that contacts the right shoulder PsR of the occupant P from the front side so as to restrain the right shoulder PsR of the occupant P, and that a ceiling-abutment section 45 that abuts the ceiling 50 of the vehicle cabin is integrally formed to an upper end portion of the leading end chamber 36.

The auxiliary shoulder-contact section 41 is configured by a rear face of a substantially triangular conical-shaped extension section 36A (see FIG. 14) that extends integrally toward the lower side from a lower end portion (lower end face) of a leading end section 37 (a rear end section in a state bent into a substantially "V" shape in plan view) side of the leading end chamber 36 when the leading end chamber 36 has been inflated and deployed. This rear face configures a planar-shaped second shoulder-restraining face 43.

The auxiliary shoulder-contact section 41 abuts the right shoulder PsR of the occupant P from the front side directly after the leading end chamber 36 has deployed, such that the shoulder PsR of the occupant P is restrained by the seatback 12. Namely, the auxiliary shoulder-contact section 41 (second shoulder-restraining face 43) only contacts the front surface of the right shoulder PsR of the occupant P without pressing against the right arm of the occupant P. Thus, the auxiliary shoulder-contact section 41 effectively assists restraint of the right shoulder PsR of the occupant P by the shoulder belt 16S in a vehicle head-on collision.

Figure 14:
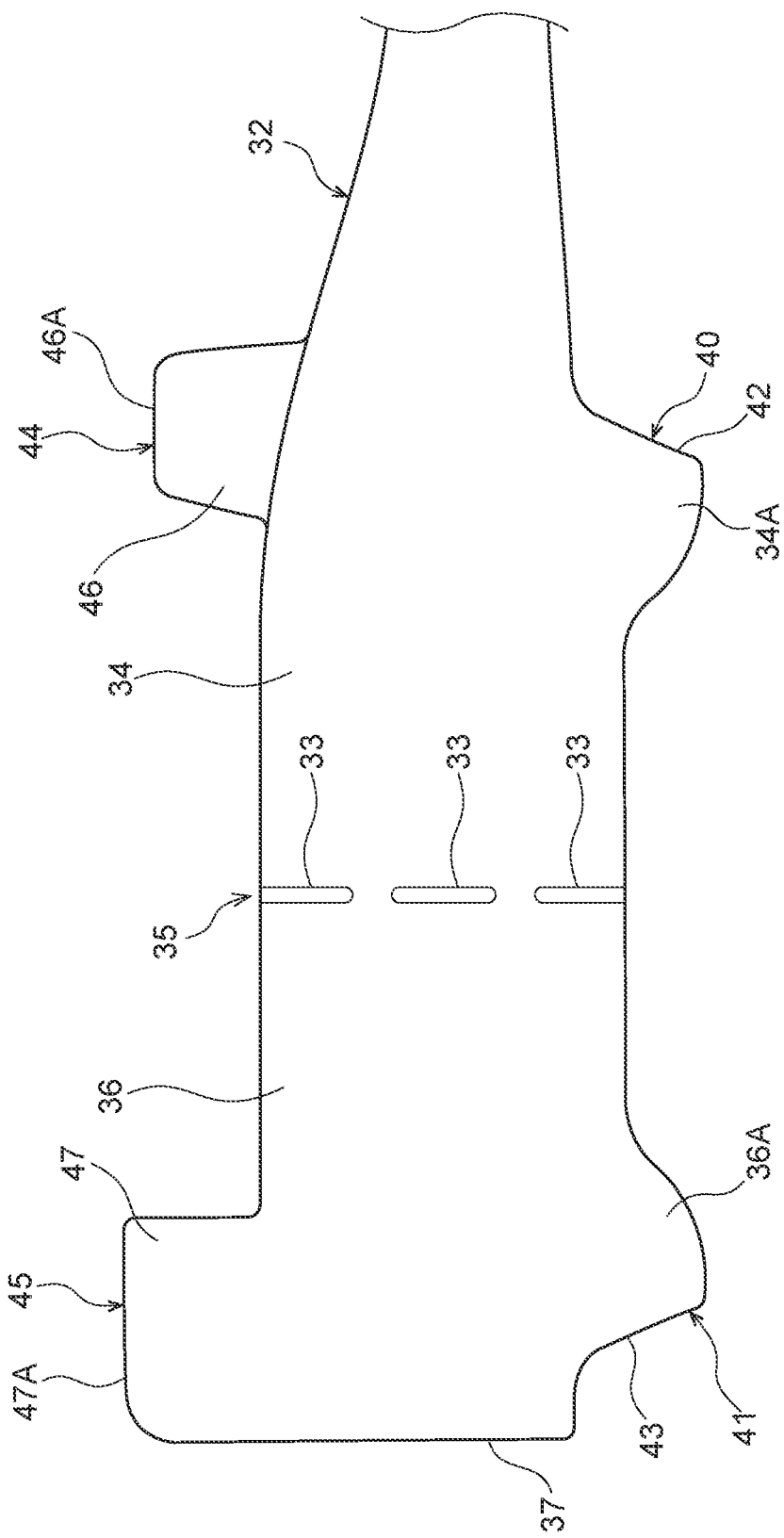
FIG. 14 is an opened-out view illustrating an airbag body of a vehicle airbag device according to the third exemplary embodiment.

The ceiling-abutment section 45 is configured by a substantially elliptical column-shaped second projecting section 47 that extends integrally toward the upper side from an upper end portion (upper end face) of the leading end chamber 36 at a location corresponding to the auxiliary shoulder-contact section 41 when the leading end chamber 36 has been inflated and deployed. Namely, as illustrated in FIG. 14, the auxiliary shoulder-contact section 41 and the second projecting section 47 are formed at substantially the same position in the front-rear direction. In other words, as illustrated in FIG. 12, the second projecting section 47 is formed at a position where at least a part thereof overlaps the auxiliary shoulder-contact section 41 in plan view. Thus, the second projecting section 47 is disposed at substantially the same position as the first projecting section 46 in side view.

As illustrated in FIG. 13, a situation in which the left shoulder PsL of the forward-moving occupant P strikes the shoulder-contact section 40 and the right shoulder PsR of the occupant P strikes the auxiliary shoulder-contact section 41 in a vehicle head-on collision, such that the airbag body 32 is pressed forward, and the boundary section 35 of the airbag body 32 attempts to rotate toward the upper side with the base section 32A of the airbag body 32 as a center of rotation in side view can be even more effectively suppressed or prevented by the ceiling-abutment section 45 (second projecting section 47).

Namely, the upper end face 46A of the first projecting section 46 abuts the ceiling 50 and an upper end face 47A of the second projecting section 47 abuts the ceiling 50, such that the first projecting section 46 (ceiling-abutment section 44) and the second projecting section 47 (ceiling-abutment section 45) bear reaction force from the ceiling 50. This suppresses rotation toward the upper side with the base section 32A side of the airbag body 32 as a center of rotation, thereby enabling the boundary section 35 of the airbag body 32 to be more effectively suppressed from riding up toward the upper-front side, and the chest of the occupant P to be more effectively suppressed from pivoting toward the lower side.

This enables a change to a relative positional relationship between the head Ph and the chest of the occupant P to be suppressed, thereby enabling the likelihood of the head of the occupant P incurring a rotational injury to be reduced and enabling an injury severity score for the neck Pn of the occupant P (torsion force arising at the neck Pn) to be reduced, in a vehicle head-on collision.

Fourth Exemplary Embodiment

Lastly, explanation follows regarding an airbag device 30 according to a fourth exemplary embodiment. Note that locations that are equivalent to those in the first exemplary embodiment to the third exemplary embodiment are allocated the same reference numerals, and detailed explanation thereof (including common operation) is omitted as appropriate.

Figure 15:
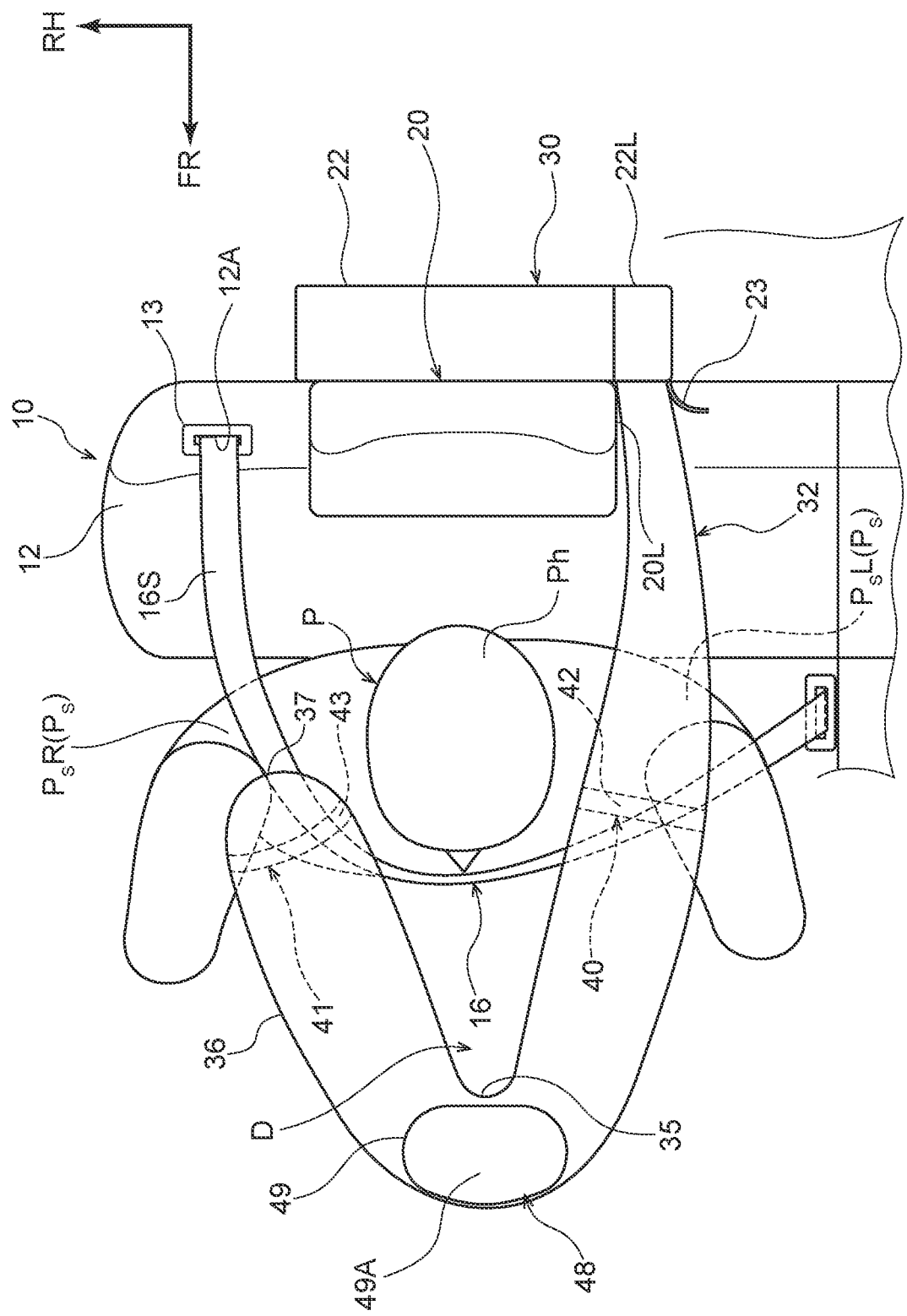
FIG. 15 is a plan view illustrating an airbag body of a vehicle airbag device according to a fourth exemplary embodiment directly after deployment is complete.
Figure 16:
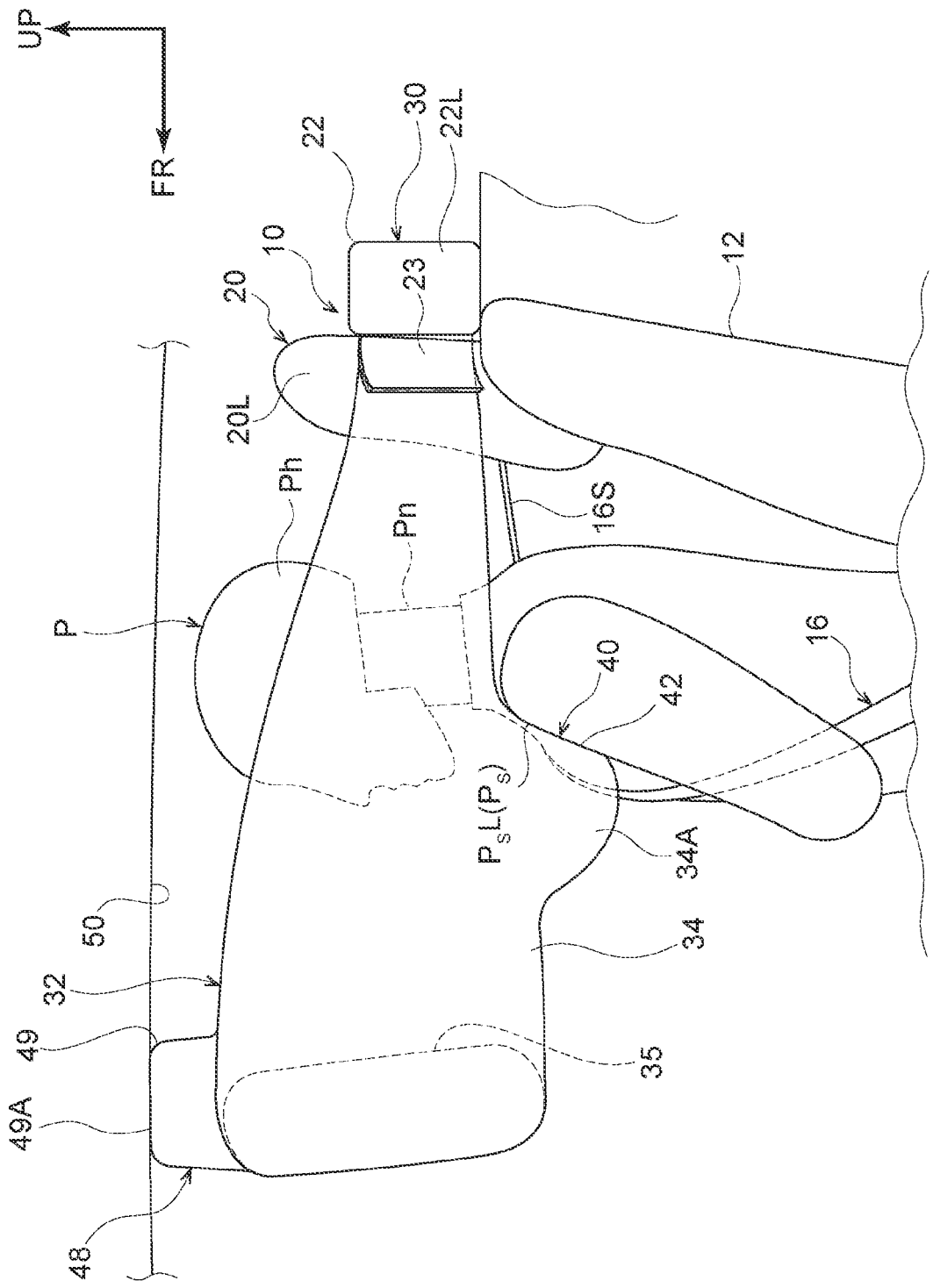
FIG. 16 is a side view illustrating an airbag body of a vehicle airbag device according to the fourth exemplary embodiment directly after deployment is complete.

As illustrated in FIG. 15 and FIG. 16, the airbag body 32 of the airbag device 30 according to the fourth exemplary embodiment only differs from the third exemplary embodiment in the respect that just a single ceiling-abutment section 48 that abuts the ceiling 50 of the vehicle cabin is integrally formed to an upper end portion of the boundary section 35 between the front-rear chamber 34 and the leading end chamber 36.

Figure 17:
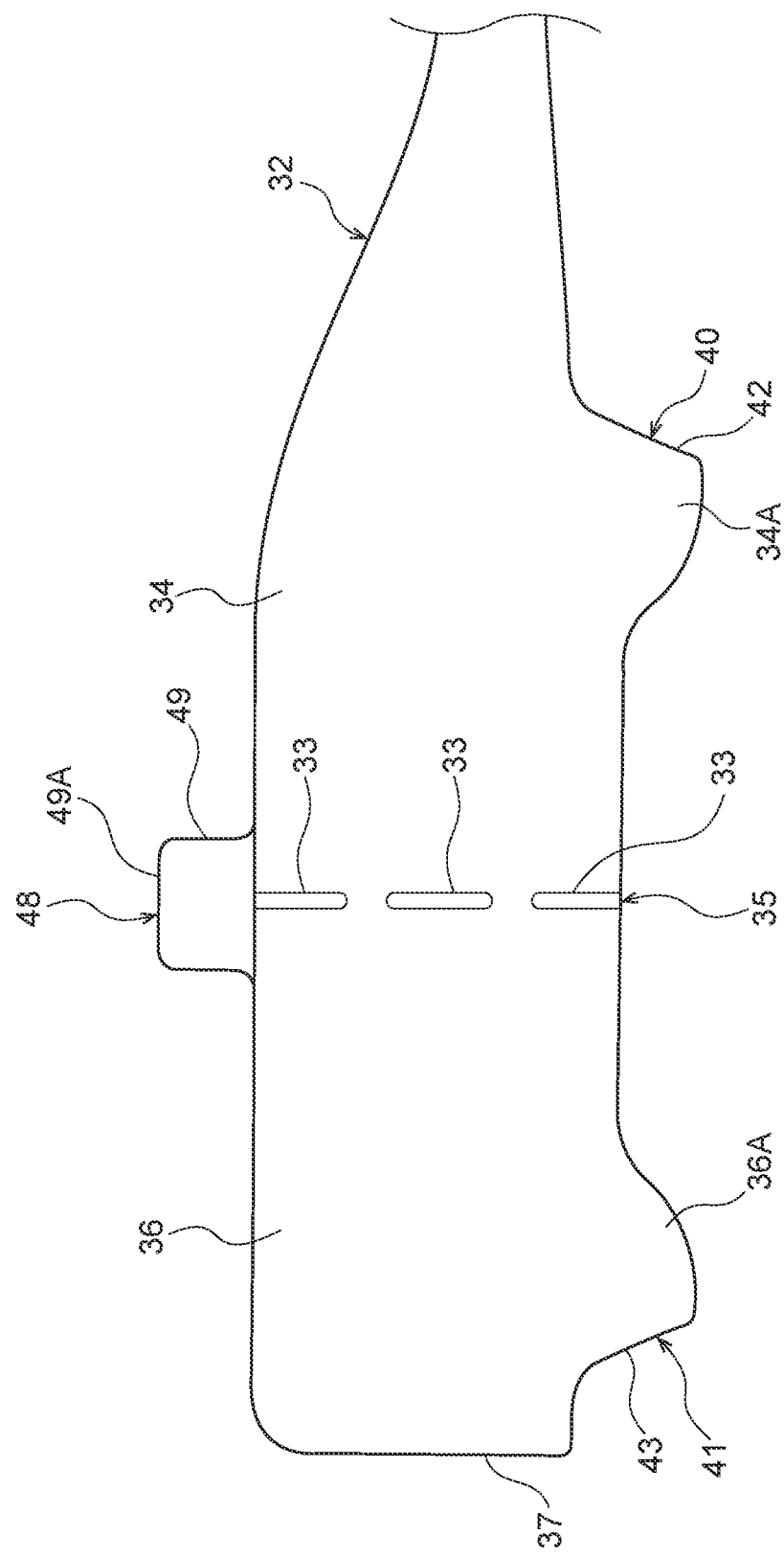
FIG. 17 is an opened-out view illustrating an airbag body of a vehicle airbag device according to the fourth exemplary embodiment.

Namely, as illustrated in FIG. 17, the ceiling-abutment section 48 is configured by just a single substantially elliptical column-shaped third projecting section 49 that extends integrally toward the upper side from the upper end portion (upper end face) of the boundary section 35 between the front-rear chamber 34 and the leading end chamber 36 when the front-rear chamber 34 and the leading end chamber 36 have been inflated and deployed.

As illustrated in FIG. 16, a situation in which the left shoulder PsL of the forward-moving occupant P strikes the shoulder-contact section 40 the right shoulder PsR of the occupant P strikes the auxiliary shoulder-contact section 41 in a vehicle head-on collision, such that the airbag body 32 is pressed forward and the boundary section 35 of the airbag body 32 attempts to rotate toward the upper side with the base section 32A of the airbag body 32 as a center of rotation in side view can be even more effectively suppressed or prevented by the ceiling-abutment section 48 (third projecting section 49).

Namely, since rotation-inducing moment is greatest on the boundary section 35 side of the airbag body 32, the third projecting section 49 (ceiling-abutment section 48) effectively bears reaction force from the ceiling 50 when an upper end face 49A of the third projecting section 49 abuts the ceiling 50. This effectively suppresses rotation toward the upper side with the base section 32A side of the airbag body 32 as a center of rotation, thereby enabling the boundary section 35 of the airbag body 32 to be more effectively suppressed from riding up toward the upper-front side, and the chest of the occupant P to be more effectively suppressed from pivoting toward the lower side.

This enables a change to a relative positional relationship between the head Ph and the chest of the occupant P to be suppressed, thereby enabling the likelihood of the head of the occupant P incurring a rotational injury to be reduced and enabling an injury severity score for the neck Pn of the occupant P (torsion force arising at the neck Pn) to be reduced, in a vehicle head-on collision.

Although airbag devices 30 according to respective exemplary embodiments have been described above with reference to the drawings, the airbag devices 30 according to these exemplary embodiments are not limited to those illustrated in the drawings, and various design modifications may be implemented as appropriate within a range not departing from the spirit of the present disclosure. For example, the airbag body 32 may be stowed in a state folded into a concertina shape. Moreover, the reaction force-withstanding plate 24 that supports the inflator 28 may be fixed to a headrest support (not illustrated in the drawings) rather than the seatback frame through a bracket (not illustrated in the drawings).

Moreover, the shoulder-contact section 40 and the auxiliary shoulder-contact section 41 are not limited to sections respectively configured by the rear faces of the extension section 34A and the extension section 36A that extend toward the lower side. For example, the front-rear chamber 34 itself and the leading end chamber 36 itself may extend toward the lower side, and lower sections of the extended head-restraining face 34B and head-restraining face 36B may be formed with the first shoulder-restraining face 42 and the second shoulder-restraining face 43 that respectively press the shoulder PsL and shoulder PsR of the occupant P from the front side.

Moreover, the third exemplary embodiment may be configured such that the ceiling-abutment section 44 (first projecting section 46) is not formed. Namely, in the case of the airbag body 32 of the third exemplary embodiment, a configuration may be applied in which just the ceiling-abutment section 45 (second projecting section 47) is formed on the leading end chamber 36 side. However, since the front-rear chamber 34 is closer to the base section 32A (fixed point 32B) than the leading end chamber 36, the front-rear chamber 34 is less liable to rock (its behavior is more stable) than the leading end chamber 36. In some embodiments, the ceiling-abutment section 44 (first projecting section 46) is formed to the front-rear chamber 34 than to the leading end chamber 36.

Moreover, the first exemplary embodiment and the second exemplary embodiment may be configured such that the auxiliary shoulder-contact section 41 is formed. Moreover, the third exemplary embodiment and the fourth exemplary embodiment may be configured such that the auxiliary shoulder-contact section 41 is not formed. Moreover, the airbag devices 30 according to the respective exemplary embodiments are not limited to being applied to the bench-type rear seating that is illustrated, and may for example be applied to rear seating configured of individual seats or to a front seat in an autonomous vehicle. Moreover, the airbag devices 30 according to the respective exemplary embodiments are also effective in an oblique collision in which a collision occurs at the oblique front side of the vehicle.

What is claimed is:

1. A vehicle airbag device, comprising an airbag body including:
   a front-rear chamber configured to pass a side of a head of an occupant seated in a vehicle seat and to deploy toward a seat front side as a result of gas being ejected from an inflator actuated in a case in which a head-on collision of a vehicle is detected or predicted, so as to be disposed at the side of the head of the occupant;
   a leading end chamber configured to deploy toward a seat width direction inner side from a seat front side end portion of the front-rear chamber so as to be disposed at the seat front side of the head of the occupant; and
   a shoulder-contact section configured to contact, from the seat front side, a first shoulder of the occupant so as to restrain the first shoulder, the first shoulder being at an opposite side from a second shoulder of the occupant across which a shoulder belt is worn,
   wherein, when the airbag body is deployed, the airbag body is bent into a V-shape in plan view.

2. The vehicle airbag device of claim 1, wherein the shoulder-contact section includes a first shoulder-restraining face configured to extend toward a seat lower side from a lower end portion of the front-rear chamber.

3. The vehicle airbag device of claim 1, wherein the airbag body includes a ceiling-abutment section configured to abut a ceiling of a vehicle cabin.

4. The vehicle airbag device of claim 3, wherein the ceiling-abutment section is configured by a first projecting section configured to extend toward a seat upper side from an upper end portion of the front-rear chamber at a location corresponding to the shoulder-contact section.

5. The vehicle airbag device of claim 3, wherein the airbag body includes an auxiliary shoulder-contact section configured to contact the second shoulder of the occupant from the seat front side so as to restrain the second shoulder of the occupant.

6. The vehicle airbag device of claim 5, wherein the auxiliary shoulder-contact section includes a second shoulder-restraining face configured to extend toward a seat lower side from a lower end portion of the leading end chamber.

7. The vehicle airbag device of claim 5, wherein the ceiling-abutment section is configured by a second projecting section configured to extend toward a seat upper side from an upper end portion of the leading end chamber at a location corresponding to the auxiliary shoulder-contact section.

8. The vehicle airbag device of claim 3, wherein the ceiling-abutment section is configured by a third projecting section configured to extend toward a seat upper side from an upper end portion of a boundary section between the front-rear chamber and the leading end chamber.

9. The vehicle airbag device of claim 1, wherein:
a head-restraining face of the leading end chamber, which is configured to restrain the head of the occupant, is set at an acute angle with respect to a central axis line of the front-rear chamber.

10. The vehicle airbag device of claim 1, wherein:
the vehicle airbag device includes a case in which the airbag body is accommodated, the case including a lid configured to open when the airbag body is deployed, and
the lid is provided at a position that has left-right symmetry relative to a position of a belt guide, configured to guide the shoulder belt at a position corresponding to the second shoulder of the occupant, with respect to a center line of the vehicle seat.

11. A vehicle airbag device, comprising an airbag body including:
a front-rear chamber configured to pass a side of a head of an occupant seated in a vehicle seat and to deploy toward a seat front side as a result of gas being ejected from an inflator actuated in a case in which a head-on collision of a vehicle is detected or predicted, so as to be disposed at the side of the head of the occupant;
a leading end chamber configured to deploy toward a seat width direction inner side from a seat front side end portion of the front-rear chamber so as to be disposed at the seat front side of the head of the occupant; and
a shoulder-contact section configured to contact, from the seat front side, a first shoulder of the occupant so as to restrain the first shoulder, the first shoulder being at an opposite side from a second shoulder of the occupant across which a shoulder belt is worn, the shoulder-contact section including a first shoulder-restraining face configured to extend toward a seat lower side from a lower end portion of the front-rear chamber.

12. The vehicle airbag device of claim 11, wherein the airbag body includes a ceiling-abutment section configured to abut a ceiling of a vehicle cabin.

13. The vehicle airbag device of claim 12, wherein the ceiling-abutment section is configured by a first projecting section configured to extend toward a seat upper side from an upper end portion of the front-rear chamber at a location corresponding to the shoulder-contact section.

14. The vehicle airbag device of claim 12, wherein the airbag body includes an auxiliary shoulder-contact section configured to contact the second shoulder of the occupant from the seat front side so as to restrain the second shoulder of the occupant.

15. The vehicle airbag device of claim 14, wherein the auxiliary shoulder-contact section includes a second shoulder-restraining face configured to extend toward a seat lower side from a lower end portion of the leading end chamber.

16. The vehicle airbag device of claim 14, wherein the ceiling-abutment section is configured by a second projecting section configured to extend toward a seat upper side from an upper end portion of the leading end chamber at a location corresponding to the auxiliary shoulder-contact section.

17. The vehicle airbag device of claim 12, wherein the ceiling-abutment section is configured by a third projecting section configured to extend toward a seat upper side from an upper end portion of a boundary section between the front-rear chamber and the leading end chamber.

18. The vehicle airbag device of claim 11, wherein:
the front-rear chamber and the leading end chamber of the airbag body form a V-shape in plan view, and
a head-restraining face of the leading end chamber, which is configured to restrain the head of the occupant, is set at an acute angle with respect to a central axis line of the front-rear chamber.

19. The vehicle airbag device of claim 11, wherein:
the vehicle airbag device includes a case in which the airbag body is accommodated, the case including a lid configured to open when the airbag body is deployed, and
the lid is provided at a position that has left-right symmetry relative to a position of a belt guide, configured to guide the shoulder belt at a position corresponding to the second shoulder of the occupant, with respect to a center line of the vehicle seat.

20. The vehicle airbag device of claim 1, wherein the shoulder-contact section has a substantially triangular conical shape and includes a planar-shaped first shoulder-restraining face defined by a rear face of the shoulder-contact section, the first shoulder-restraining face configured to extend toward a seat lower side from a lower end portion of the front-rear chamber.

21. The vehicle airbag device of claim 1, wherein the shoulder-contact section is configured to abut the first shoulder of the occupant from the seat front side prior to completing deployment of the leading end chamber.

22. The vehicle airbag device of claim 4, wherein the first projecting section is formed in a block shape on the upper end portion of the front-rear chamber.

23. The vehicle airbag device of claim 4, wherein the first projecting section is formed at a position where at least a part of the first projecting section overlaps the shoulder-contact section in the seat width direction in plan view.

24. The vehicle airbag device of claim 6, wherein the auxiliary shoulder-contact section has a substantially triangular conical shape and includes a planar-shaped second shoulder-restraining face defined by a rear face of the auxiliary shoulder-contact section, the second shoulder-restraining face configured to extend from a lower end portion of the leading end section.

25. The vehicle airbag device of claim 7, wherein the second projecting section is disposed at substantially the same position as the first projecting section in a seat front-rear direction in side view.

26. The vehicle airbag device of claim 8, wherein the third projecting section has an elliptical column shape and extends toward the seat upper side from the upper end portion of the boundary section between the front-rear chamber and the leading end chamber.

\* \* \* \* \*